(12) United States Patent
Schweikert et al.

(10) Patent No.: US 10,184,860 B2
(45) Date of Patent: Jan. 22, 2019

(54) CONTROL SYSTEM FOR POWER TRAIN CONTROL

(71) Applicant: Infineon Technologies AG, Neubiberg (DE)

(72) Inventors: Christian Schweikert, Munich (DE); Patrick Leteinturier, Riemerling (DE)

(73) Assignee: Infineon Technologies AG, Neubiberg (DE)

(*) Notice: Subject to any disclaimer, the term of this patent is extended or adjusted under 35 U.S.C. 154(b) by 182 days.

(21) Appl. No.: 15/094,474

(22) Filed: Apr. 8, 2016

(65) Prior Publication Data

US 2017/0292898 A1  Oct. 12, 2017

(51) Int. Cl.
*G01M 15/06* (2006.01)
*F02D 41/00* (2006.01)
(Continued)

(52) U.S. Cl.
CPC .......... *G01M 15/06* (2013.01); *F02D 41/009* (2013.01); *F02D 41/26* (2013.01); *F02D 41/266* (2013.01);
(Continued)

(58) Field of Classification Search
CPC .............. F02D 41/009; F01L 2820/041; F01L 2820/042; G01M 15/06
See application file for complete search history.

(56) References Cited

U.S. PATENT DOCUMENTS 3,914,580 A  10/1975  Watson et al.
4,408,584 A  10/1983  Yabuhara et al.
(Continued)

FOREIGN PATENT DOCUMENTS

CN  1317501 C  5/2007
DE  3128193 A1  3/1982
(Continued)

OTHER PUBLICATIONS

Office Action from U.S. Appl. No. 15/094,497, dated Sep. 27, 2017, 12 pp.
(Continued)

*Primary Examiner* — Lisa Caputo
*Assistant Examiner* — Herbert K Roberts
(74) *Attorney, Agent, or Firm* — Shumaker & Sieffert, P.A.

(57) ABSTRACT

Embodiments of the present disclosure relate to methods, system, and devices for synchronizing angular position information between a first and a second semiconductor chip used for engine management in an automobile is described. In accordance with one embodiment, a system for synchronizing angular position information between a first and a second semiconductor chip comprises the first and the second semiconductor chip and a digital real-time communication link connecting the first and the second semiconductor chip. The second semiconductor chip comprise a master angle estimation circuit, which is configured to estimate an angular position of the engine based on at least one angular position sensor signal. The first semiconductor chip comprises a slave angle estimation circuit, which is configured to estimate an angular position of the engine based on information concerning angular position received form the master angle estimation circuit via the communication link.

20 Claims, 28 Drawing Sheets

(51) Int. Cl.
*F02D 41/28* (2006.01)
*F02D 41/26* (2006.01)

(52) U.S. Cl.
CPC ........ *F02D 41/28* (2013.01); *F01L 2820/041* (2013.01); *F01L 2820/042* (2013.01)

(56) References Cited

U.S. PATENT DOCUMENTS

| | | | |
|---|---|---|---|
| 5,178,115 | A | 1/1993 | Daly |
| 5,284,116 | A | 2/1994 | Richeson, Jr. |
| 5,481,456 | A | 1/1996 | Ogura |
| 5,737,630 | A | 4/1998 | Kobayashi |
| 6,009,370 | A | 12/1999 | Minowa et al. |
| 6,360,725 | B1 | 3/2002 | Scherrbacher |
| 6,820,000 | B2 | 11/2004 | Miyano et al. |
| 6,892,129 | B2 | 5/2005 | Miyano |
| 7,280,339 | B2 | 10/2007 | Manzone et al. |
| 7,512,469 | B2 | 3/2009 | Tohdo et al. |
| 7,539,610 | B2 | 5/2009 | Imada et al. |
| 2004/0230347 | A1 | 11/2004 | Sakurai et al. |
| 2005/0263138 | A1* | 12/2005 | Sheikh ............ F02B 77/087 123/476 |
| 2008/0109151 | A1 | 5/2008 | Jaros et al. |
| 2008/0172506 | A1 | 7/2008 | Ellerbrock et al. |
| 2009/0190283 | A1 | 7/2009 | Hammerschmidt et al. |
| 2010/0169696 | A1 | 7/2010 | D'Angelo et al. |
| 2010/0274416 | A1 | 10/2010 | Poisson |
| 2011/0250756 | A1 | 10/2011 | Uchikura et al. |
| 2014/0150751 | A1 | 6/2014 | Cheever, Jr. et al. |
| 2015/0057806 | A1 | 2/2015 | Schweikert et al. |
| 2015/0268063 | A1* | 9/2015 | Lepage ............ G01D 5/142 324/207.2 |

FOREIGN PATENT DOCUMENTS

| | | |
|---|---|---|
| JP | 5013732 A | 2/1975 |
| WO | 9949195 A1 | 9/1999 |

OTHER PUBLICATIONS

Analog Integrated Circuit Device Data, Freescale Semiconductor Advance Information, "Automotive Engine Control IC," wwww.freescale.com, Doc. No. MC33810, Rev. 6.0, Dec. 2008, 35 pp.

"Flex MultiChannel Low-Side Switches, Solutions for Powertrain, Safety and industrial Applications," www.infineon.com/flex, Order No. B0000-H0000-X-X-7600, Sep. 2010, 16 pp.

"TLE 8718 SA Smart 18-Channel Lowside Switch with Micro Second Bus," www.infineon.com, Data Sheet, Rev. 1.1, Jul. 31, 2012, 82 pp.

Leteinturier et al., "Enhanced Engine Position Acquisition & Treatment," SAE Technical Paper Series, 1999-1-0203, Jan. 1999, 13 pp.

"Road vehicles—Functional safety—Part 1: Vocabulary," ISO 26262-1:2011(E), International Standard, Nov. 15, 2011, 30 pp.

U.S. Appl. No. 15/094,497, by Christian Schweikert et al., filed Apr. 8, 2016.

* cited by examiner

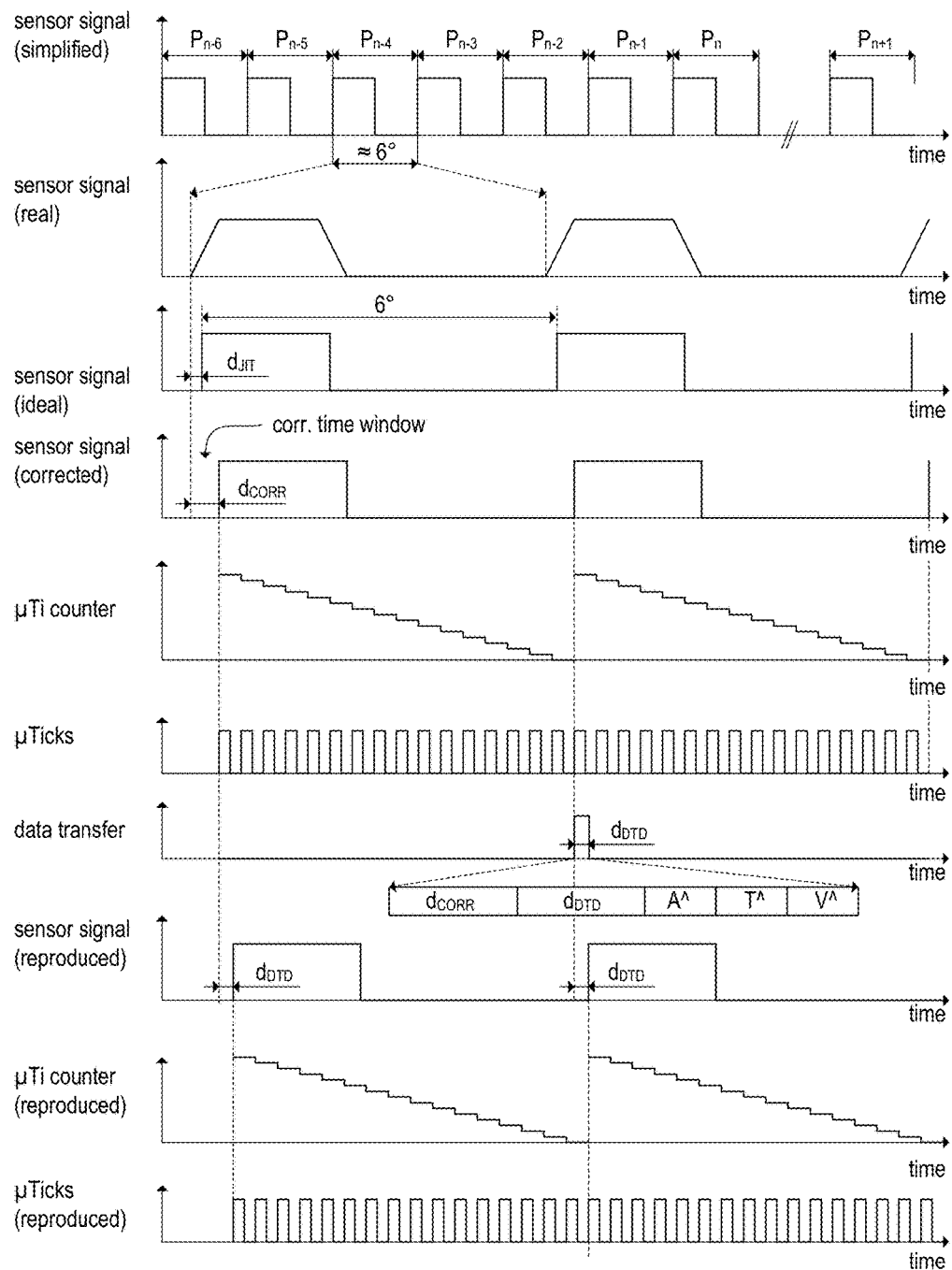
Fig. 12A (steady state)

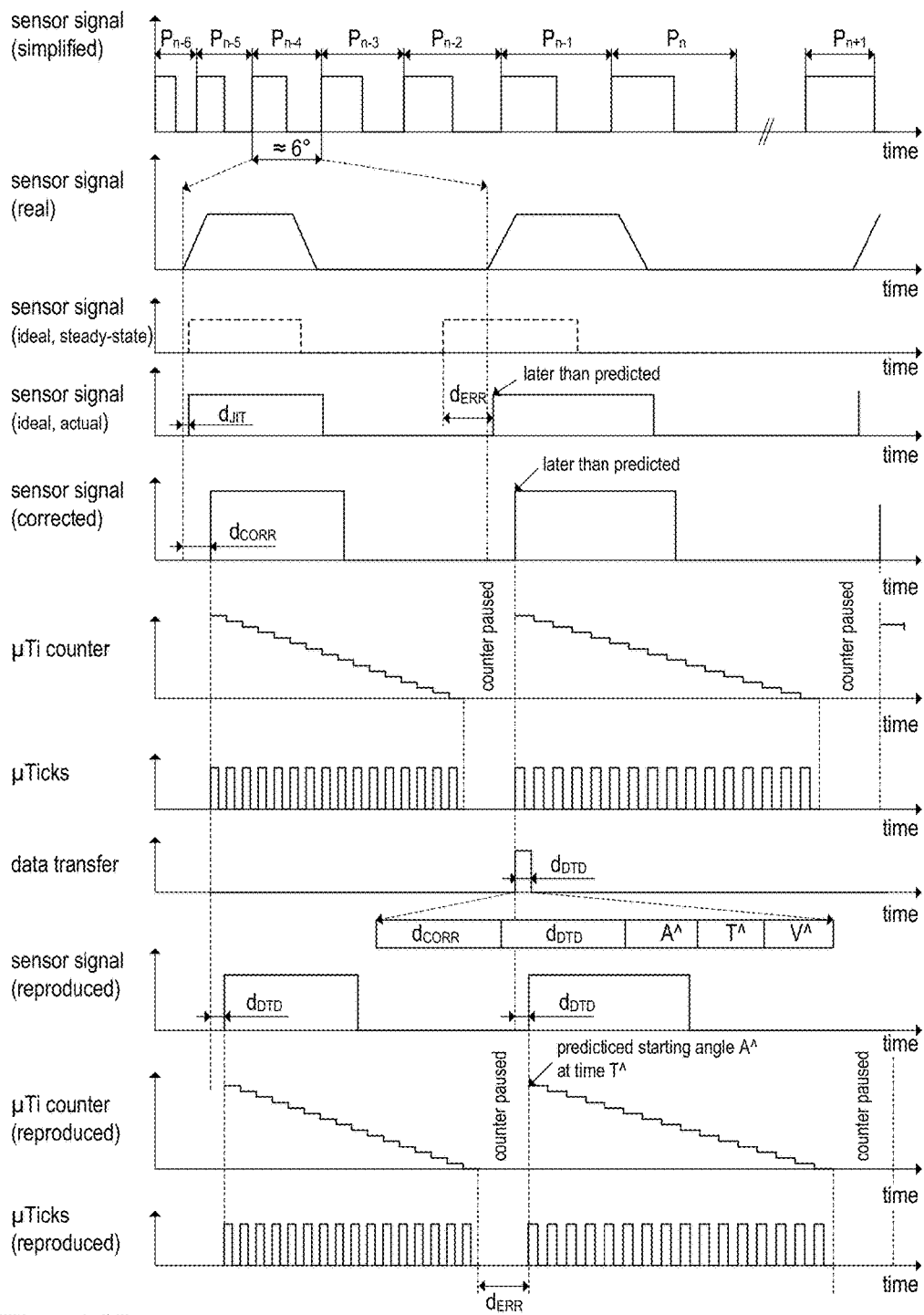
Fig. 12B (deceleration)

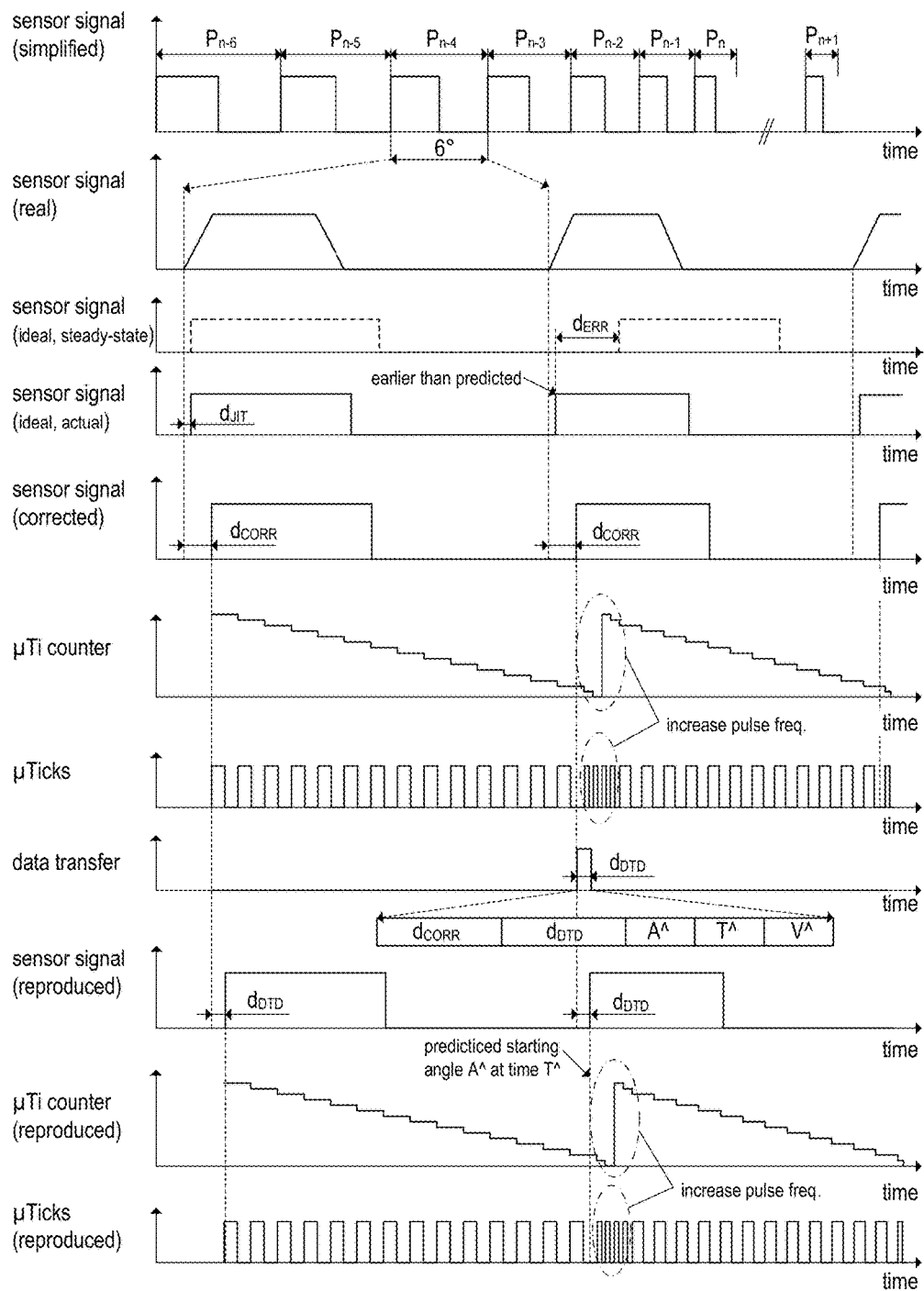
Fig. 12C (acceleration)

CONTROL SYSTEM FOR POWER TRAIN CONTROL

TECHNICAL FIELD

This disclosure relates to the field of engine control, in particular to the structure of the control system usually included in an engine control unit (ECU) and used to control the operation of an internal combustion engine.

BACKGROUND

Systems used for controlling the operation of internal combustion engines have become fairly complex and continuous further development is induced—inter alia—by changes in the legislation with regard to fuel consumption, exhaust gas emissions. Further aspects are the general need to reduce production costs, and the current use of different system architectures in the systems of the powertrain of an automobile Today, the engine control of a gasoline combustion engine (Otto engine) today is either based on gasoline direct injection (GDI) or multi-port fuel injection (MPI). Other types of engines are Diesel engines or flexible fuel engines, which are able to combust ethanol, liquefied petroleum gas (LPG), compressed natural gas (CNG), etc. A vast variety of engine control systems and functions exist as well as many different types of sensors and actuators used to implement the engine control. The set-up of an engine control unit (ECU) may be specific for each automobile manufacturer. Many different sensors, actuators, and communication interfaces usually have to be supported be an ECU, which for the greater part developed and produced by car component suppliers and not by the automobile manufacturers. Today, almost all control functions needed for engine control are provided by semiconductor devices, which are mounted on a printed circuit board (PCB) included in the ECU. Examples for such semiconductor devices are application-specific micro controllers (μC) with volatile memory (RAM) and non-volatile memory (NVM), transceiver devices for communication between different PCBs or ECUs, devices providing power supply, so-called smart power devices (intelligent semiconductor switches), power devices (power semiconductor switches) and various interface devices to connect sensors.

Particularly in engine control applications the information of various sensors connected to the ECU as well as the operation of many actuators is related to the crankshaft angle. therefore modern engine control algorithms need a precise angle information that is well synchronized to the timer used by the ECU. Usually, all angle-related signal processing is concentrated in a highly application-specific micro-controller that is arranged on the PCB of the ECU. Relocating at least some parts of the angle-related signal processing into dedicated "smart" peripheral integrated circuits, which are separate from the micro-controller may give rise to problems as commonly available techniques to connect two separate ICs (e.g. serial peripheral interface (SPI), Microsecond Bus)—at least for some applications—are not be suitable (with regard to transmission delay, data rate and real-time capability) to exchange high-resolution crankshaft information between two separate ICs-

SUMMARY

A electronic control unit for engine control in an automobile is described herein. In accordance with one embodiment the electronic control unit comprises a first semiconductor chip with first circuitry integrated therein, a second semiconductor chip with second circuitry integrated therein, a digital real-time communication link connecting the first circuitry and the second circuitry. The second circuitry comprises a master angle estimation circuit, which is configured to estimate an angular position of the engine based on at least one angular position sensor signal. Furthermore, the first circuitry comprises a slave angle estimation circuit, which is configured to estimate an angular position of the engine based on information concerning angular position received form the master estimation circuit via the communication link.

Moreover, a system for synchronizing angular position information between a first and a second semiconductor chip used for engine management in an automobile is described. In accordance with one embodiment, the system comprises the first semiconductor chip, which has first circuitry integrated therein, the second semiconductor chip, which has second circuitry integrated therein, a digital real-time communication link connecting the first circuitry and the second circuitry. The second circuitry comprise a master angle estimation circuit, which is configured to estimate an angular position of the engine based on at least one angular position sensor signal. Furthermore, the first circuitry comprise a slave angle estimation circuit, which is configured to estimate an angular position of the engine based on information concerning angular position received form the master angle estimation circuit via the communication link.

Furthermore, a method for synchronizing angular position information between a first and a second semiconductor chip used for engine management in an automobile is described. In accordance with one embodiment, the method comprises receiving, in the second semiconductor chip, at least one angular position sensor signal indicative of an angle of the engine to be synchronized, estimating, in the second semiconductor chip, a master angular position signal based on at least one angular position sensor signal, and transmitting synchronization information from the first to the second semiconductor chip via a digital real-time communication link. The synchronization information including estimated angular position information based on the angular position sensor signal. In the first semiconductor chip, a slave angular position signal is estimated based on synchronization information received form the second semiconductor chip.

BRIEF DESCRIPTION OF THE DRAWINGS

This disclosure can be better understood with reference to the following description and drawings. The components in the figures are not necessarily to scale, emphasis instead being placed upon illustrating the principles of this disclosure. Moreover, in the figures, like reference numerals designate corresponding parts. In the drawings:

FIGS. 12A-12C illustrate by timing diagrams the generation of micro-ticks for high resolution angle measurement in the master and slave angle estimation devices, wherein FIG. 12A illustrates a steady state, FIG. 12B deceleration and FIG. 12C acceleration of the engine.

DETAILED DESCRIPTION

As mentioned above, current implementations of engine control systems have reached a kind of optimum with regard to an efficient, qualitative and quantitative scalability and a continued increase of integration density does not seem to provide any further benefit. Increasing integration density may either even increase costs or is technically not feasible, due to e.g. power dissipation and power density. For example, further integration may lead to in-efficient implementation on chip and package level as most components are mixed signal ICs (integrated circuits) integrating digital (logic) electronic, analog electronic, as well as power electronic. The embodiment described herein therefore make use of an alternative approach, different from the classical approach of shrinking semiconductor structures and continuing to increase integration density.

The embodiments described herein are directed to an engine control unit (ECU). Nevertheless, the same concepts used in ECUs as described herein can also be applied to valid for a wide range other control systems used in an automobile, such as transmission control systems, hybrid- and electric powertrain control systems, chassis control systems including braking and vehicle stability control, safety control systems such as used in an airbag control unit, as well as advanced driver assistance systems.

Figure 1:
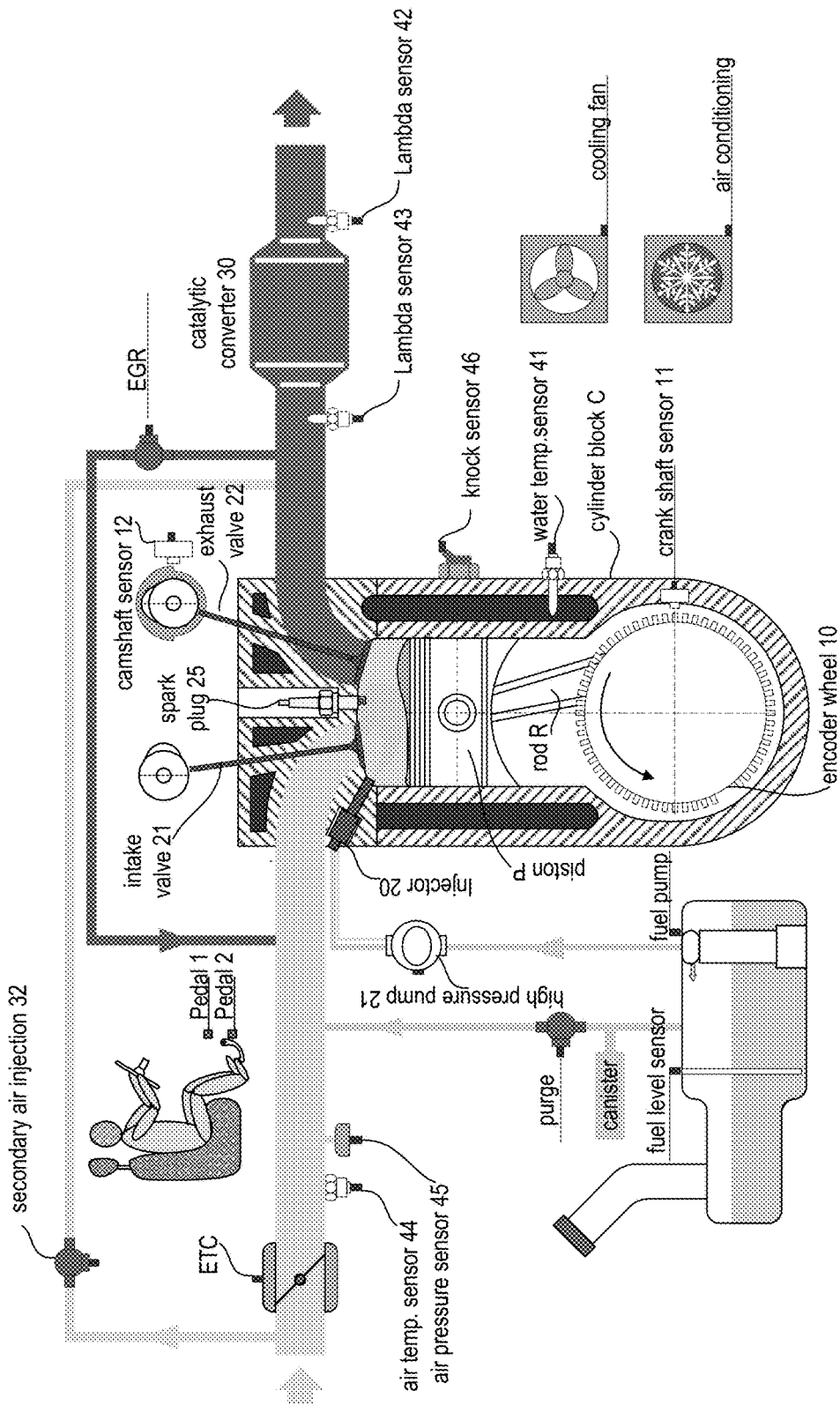
FIG. 1 illustrates schematically the structure of a gasoline direct injection (GDI) internal combustion engine including sensors and actuators used for the engine control.

FIG. 1 illustrates an internal combustion engine and the basic functions, which are provided by modern engine management systems, by way of an exemplary schematic sketch showing a singly cylinder of an internal GDI (gasoline direct injection) combustion engine and some peripheral components. The construction of an internal combustion engine is generally known in the automotive field and thus only roughly summarized here. FIG. 1 schematically shows a cross section through a cylinder block C, so one can see one piston P, which is coupled to the crankshaft via a piston rod R. An encoder wheel 10 is mounted to the crankshaft to allow incremental angular position measurement of the crank-shaft using a magnetic crankshaft sensor 11 (e.g. a Hall sensor or an inductive sensor). Today usually tooth-wheels, which have a pitch of 6 degrees, are commonly used as encoder wheels. The teeth are detected by as the crankshaft rotates and the crankshaft sensor 11 detects the teeth of the tooth wheel passing the crankshaft sensor 11. Various sensor arrangements composed of an encoder wheel and a magnetic crankshaft sensor are known in the automotive field and thus not further discussed here in detail. It should be however noted, that other types of encoder wheels (e.g. magnetic multi-pole wheels) and other types of magnetic sensors could be used instead of the shown tooth wheel and Hall sensor. Although a gasoline engine is shown in the example of FIG. 1, the embodiments described herein may also applied to other types of gasoline engines, diesel engines, flex fuel engines or any other types of internal combustion engines.

The intake valve 21 and the exhaust valve 22 of the cylinder are operated by the camshaft, wherein an angular position of the camshaft is detected by a camshaft sensor 12. The fuel injector 20 is configured to inject a defined amount of fuel into the cylinder at a well-defined angular position of the crankshaft. In order to control the fuel injectors, an engine control unit (ECU) is employed, which is configured to precisely determine the angular position of the crankshaft based on the signals provided by the crankshaft sensor 11 and the camshaft sensor 12. The deployed fuel-air mixture is ignited by the spark plug 25 at a specific time instant defined by an engine control unit (ECU). Besides the control of the injectors and the ignition, the ECU controls many other peripheral components used to operate the internal combustion engine. The peripheral components are, inter alia, the air intake, exhaust gas recirculation (EGR), the high pressure fuel pump 21, the catalytic converter 30, the secondary air injection 32, the electronic throttle control ETC, etc. To accomplish all these control tasks, various sensors are used, such as, inter alia, the mentioned crankshaft and camshaft sensors 11, 12, a water temperature sensor 41, Lambda sensors 42, 43, pedal position sensors (Pedal 1 and Pedal 2), intake air temperature sensor 44, barometric air pressure sensor 45 or, optionally, an air mass flow sensor, knock sensor 46, etc. All those peripheral components and sensors are as such known in the automotive field and are thus not further discussed here.

The output signals of the above-mentioned sensors, which are used to control the operation of the internal combustion engine, are supplied to the engine control unit (ECU), which processes the signal and provides drive signals for driving/controlling the above-mentioned actors (e.g. the fuel injectors 20 and the mentioned peripheral components). Modern ECUs are highly complex systems which provide a variety of different functions, which are summarized in the diagram of FIG. 2. Accordingly, the ECU provides, inter alia, functions concerning the (air) intake system, the ignition system, the fuel system (including fuel injection), the exhaust system (including, e.g. the EGR), and accessory control (e.g. cooling fan, fuel pump, water pump, air condition control, etc.) The ECU further provides functions concerning torque control, functions concerning power supply, monitoring and diagnosis functions, as well as functions concerning communication with external devices (e.g. via a CAN bus). The function block labelled "safety functions" represents all functions necessary to comply with functional safety standards (defined, e.g. in ISO 26262 titled *"Road vehicles—Functional safety"*) and assure the required ASIL (automotive safety integrity level). For example, one safety function is the limitation of the intake air to limit the torque in case of a failure of other engine control functions. The function block labelled "security functions" relates to functions that ensure the integrity of data and access control (e.g. to prevent undesired engine tuning). The function blocks "μC control" and "system control" relate to functions for controlling the operation of the automotive micro-controller as well as of the overall ECU. The function block "operating data, program code" relates to software instructions and data processed by the automotive micro-controller.

Figure 2:
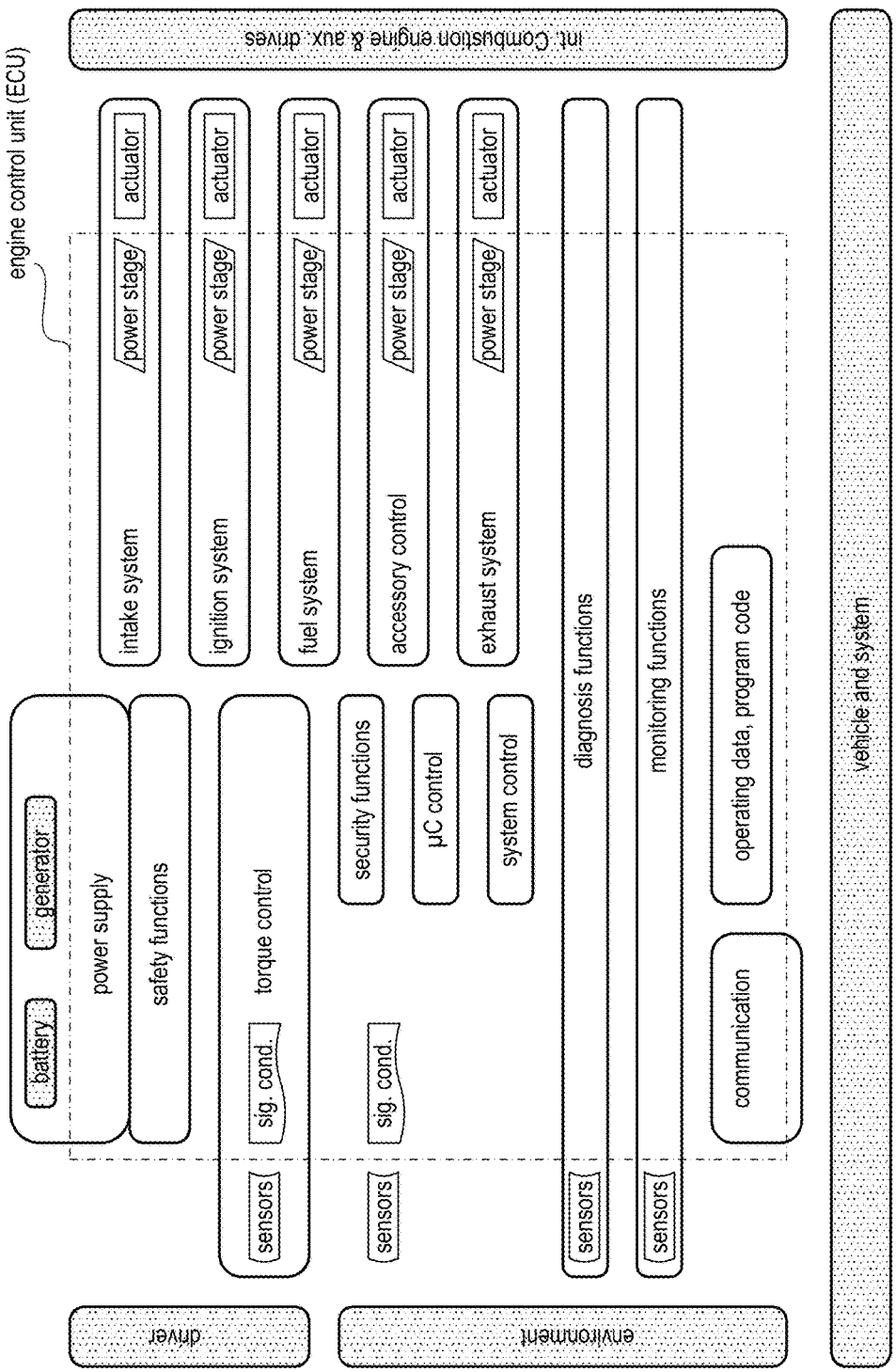
FIG. 2 illustrates by way of example the basic functions provided by a modern engine management system.
Figure 3A:
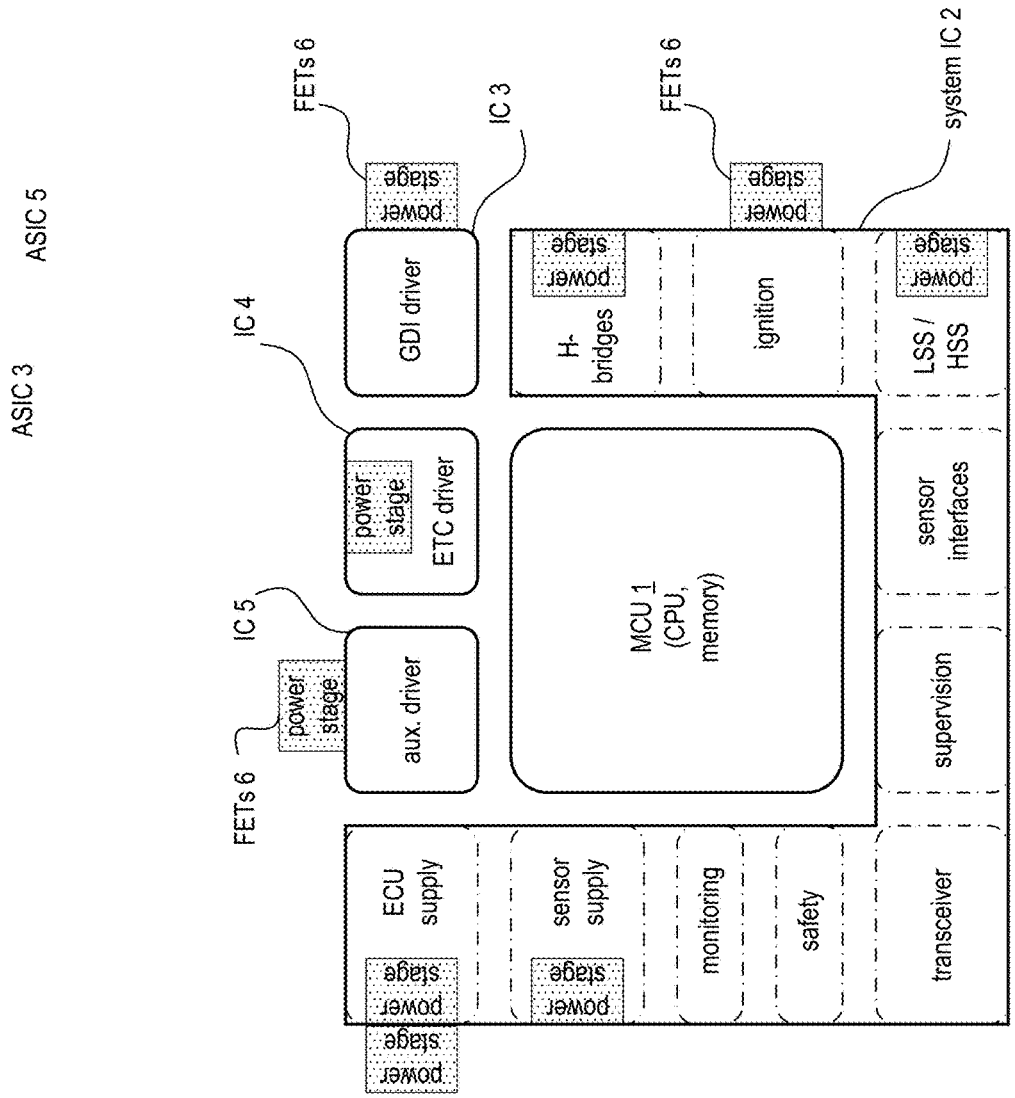
FIGS. 3A and 3B illustrate the integrated circuits (ICs) arranged on a printed circuit board (PCB) of an engine control unit (ECU) as well as the functions assigned to the ICs according to a present integration level (FIG. 3A) and with a higher integration level (FIG. 3B), which could be the highest level of integration when following the traditional "evolutionary" design approach.
Figure 3B:
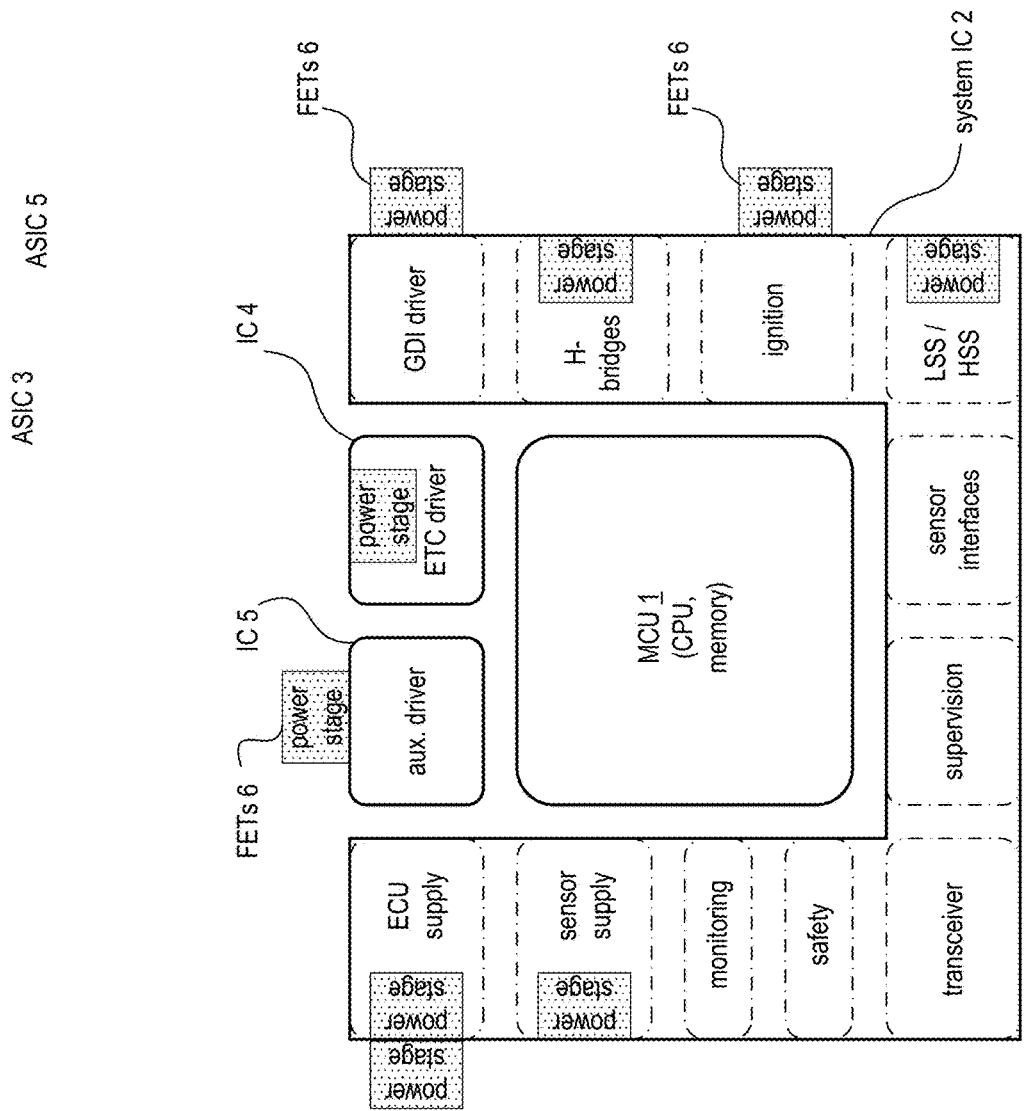

In a common engine control unit (ECU) all the functions illustrated in FIG. 2 are mainly provided using an application specific automotive micro controller, further referred to as microcontroller unit 1 (MCU) and one or more application specific ICs (ASICs) 2, 3, 4, 5, as well as some power semiconductor switches to drive specific actuators (e.g. the fuel injectors, the spark plugs, etc) also referred to as power stages 6. FIG. 3A illustrates the different ASICs of a today's ECU implementing the functions discussed above considering the present level of integration. The MCU 1 is configured to execute various software modules, which provide the core functions needed for engine control (i.e. the "intelligence" of the ECU), wherein the external (with regard to the MCU 1) ASICs 2, 3, 4 basically provide auxiliary/supplementary functions such as power supply for the ECU and for connected sensors, electronic power switches, analog signal conditioning, fuel injector driver stages (GDI driver), etc. For years up to now, progress in the ECU development consisted in increasing integration density by shrinking the size of semiconductor structures. This "evolutionary" process of further development leads to more and more auxiliary functions being concentrated in one highly integrated ASIC, which is also referred to as System IC 2. So when further developing the existing "traditional" ECU design approach of using one central MCU 1 and a highly integrated system IC 2, almost all auxiliary/supplementary functions will be integrated in a single system IC 2 with only very few remaining functions being implemented using separate ASICs or other integrated circuit (IC) devices. So starting with a current ECU structure as shown in FIG. 3A the logical next step (when following the mentioned evolutionary process of increasing integration density) could be to include, for example, the GDI driver IC 3 into the System IC 2 as shown in FIG. 3B. The "intelligence" including the all the signal processing required to accomplish the control and monitoring tasks provided by the ECU is concentrated in the MCU 1. This signal processing includes, for example, the processing of the sensor signals and the generation of the control signal for driving/regulating various actors (e.g. valves, fuel injectors, pumps, etc.). As can be seen in FIGS. 3A and 3B, some power stages are integrated in the System IC 2. In common ECU designs low and medium power stages are integrated into the System IC 2, which is usually manufactured using a BCD (Bipolar-CMOS-DMOS) technology. High Power stages 6 are usually separate from the System IC to simplify heat dissipation. Theoretically, all functional components could be integrated in one System IC. However, some functions such as, for example, the electronic throttle control (ETC) better remains separate for safety reasons as mentioned above (e.g. in order to be able to comply with functional safety standards and required ASIL).

Figure 4:
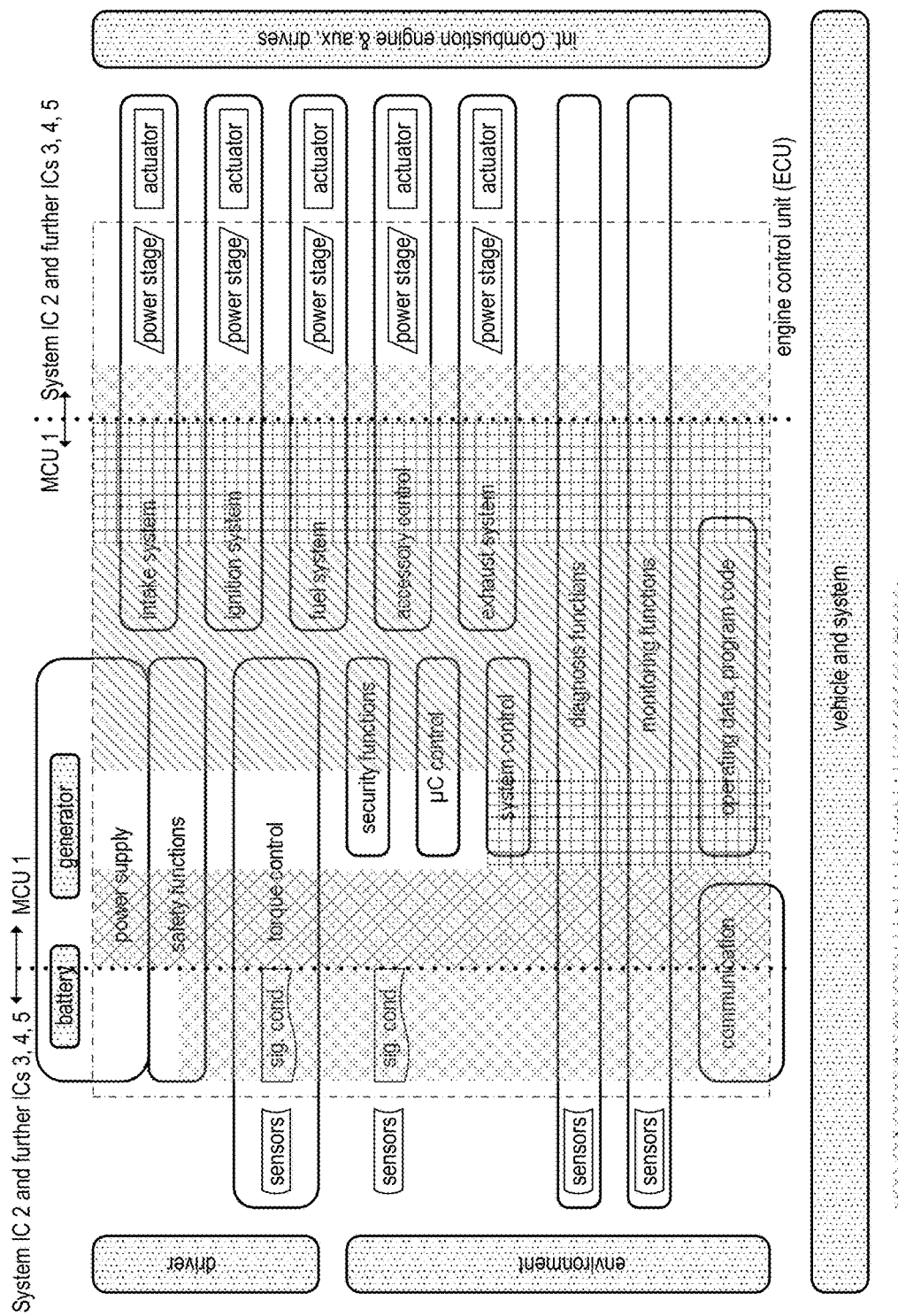
FIG. 4 shows the same diagram as FIG. 2 but with an additional shading indicating the type of hardware implementing the depicted functions as well as the traditional ECU hardware partitioning (microcontroller and system IC).

FIG. 4 illustrates how the functions provided by an ECU and shown in FIG. 2 are roughly distributed between the MCU 1 and the System IC 2 (and further ICs not integrated in the System IC). The previous FIG. 2 illustrates the ECU purely by its functions, wherein FIG. 4 shows the same functions as FIG. 2 and is shaded with additional hatch patterns, which indicate how the individual functions are implemented. Thereby, a dotted pattern indicated analog electronic for analog signal processing (ASP), which includes analog sensor interfaces (e.g. amplifier, filters, etc.) as well as (pre-) driver circuits for driving the power stages that are connected to different actuators. The horizontally and vertically cross-hatched pattern represents (software) configurable hardware such as timers, counters, etc, which are used, for example, to trigger actuators or to process sensor signals. The slanted cross-hatched pattern represents transceivers and battery-related function blocks. Finally, the slanted hatched pattern represents application software (SW) executed by a processor core of the MCU 1. As can be seen the MCU 1 includes the application software, configurable hardware as well as transceivers and battery-related functions, whereas the System IC 2 mainly includes analog circuitry for analog signal processing and (pre-) drivers for driving various actuators. The System IC also includes power stages for switching low-power and medium-power loads.

Figure 5:
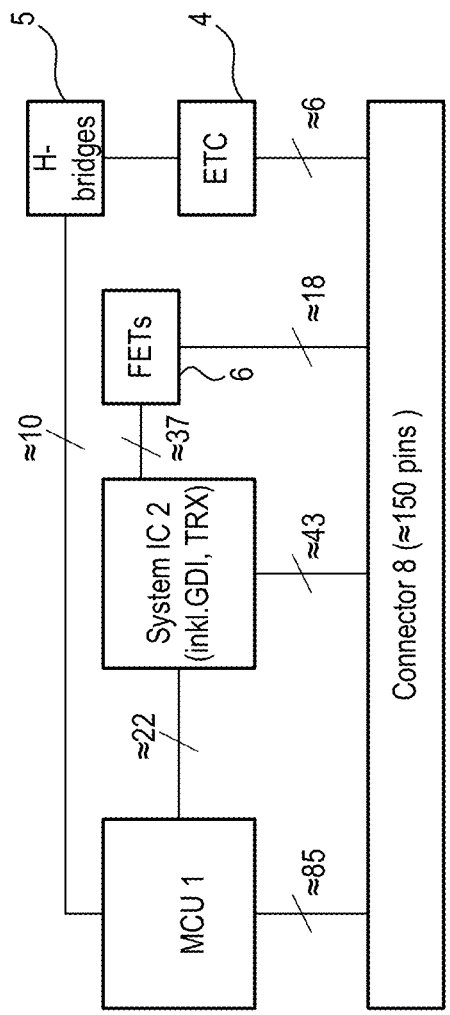
FIG. 5 illustrates in a simplified block diagram the circuit components arranged on the PCB of an ECU according to FIG. 3B and their interconnections.

FIG. 5 illustrates schematically the interconnections of MCU 1, System IC 2, further ICs 4 and 5 and a connector 8 on a printed circuit board (PCB). The further ICs 4 and 5 provide auxiliary/supplementary functions that are not (yet) integrated in the system IC 2 (see also FIG. 3B). It can be seen that the number of pins and interconnections is relatively high, which makes chip packages expensive and the signal routing on the PCB complex. The MCU 1 as well as the system IC have more than 150 pins, which have to be connected on the PCB. In the present example, the System IC 2 may include one or more transceiver circuits (TRX, physical layer circuitry, i.e. layers 1 and 2 of the OSI model), for example transceiver circuits for interfacing with CAN, LIN or FlexRay busses or—in future systems—even with an Ethernet network. The block 6 labelled FETs represents several discrete high power switches, which have not been integrated in the system IC 2. The IC 5 implements the electronic throttle control (ETC), which is not integrated in the system IC 2 for safety reasons (see also FIG. 3B). In the current example, the GDI driver is integrated in the System IC 2. However, the GDI driver may also be integrated in a separate IC (cf. FIG. 3A).

With the mentioned traditional concept of ECU design a kind of optimum has been reached with regard to on-board connectivity and the pin count of the packaged integrated circuits. A further increase of integration would entail a higher number of pins of the system IC and the MCU package, which makes the signal routing on the PCB board more complex, and thus the required space may even increase despite of the higher integration. Additionally or alternatively, the number of routing layers of the PCB would have to be increased, which may also have a negative effect on the overall system costs. Moreover, an increased integration density may entail a comparably high power density on the silicon chip, which generally entails a higher cooling requirements, such as the need for PCB materials with a higher glass-temperature and additional heat sinks. Finally, the positioning of the ICs on the PCB may be restricted du to thermal boundary conditions.

As the highly integrated system IC includes circuitry for processing analog and digital signals as well as power circuitry, the system IC usually is realized using a BCD (Bipolar-CMOS-DMOS) process technology, which is more costly as compared to using other process technologies such as, for example, high voltage CMOS (HV-CMOS) process technologies or pure power semiconductor manufacturing technologies such as SFET or MOSFET. To summarize the above, continuing the current approach of ECU design (which expedites miniaturization and highly integrated system ICs, in which many auxiliary/supplementary functions are concentrated) will hardly bring an additional benefit, particularly when high computing power and high-current switching are to combined in one chip. Due to the use of very application-specific components, the scalability of the present ECU design is low. The ECU design is inflexible with regard to changes, and changes in the system are difficult to implement and entail comparably high research and development expenses.

Figure 6:
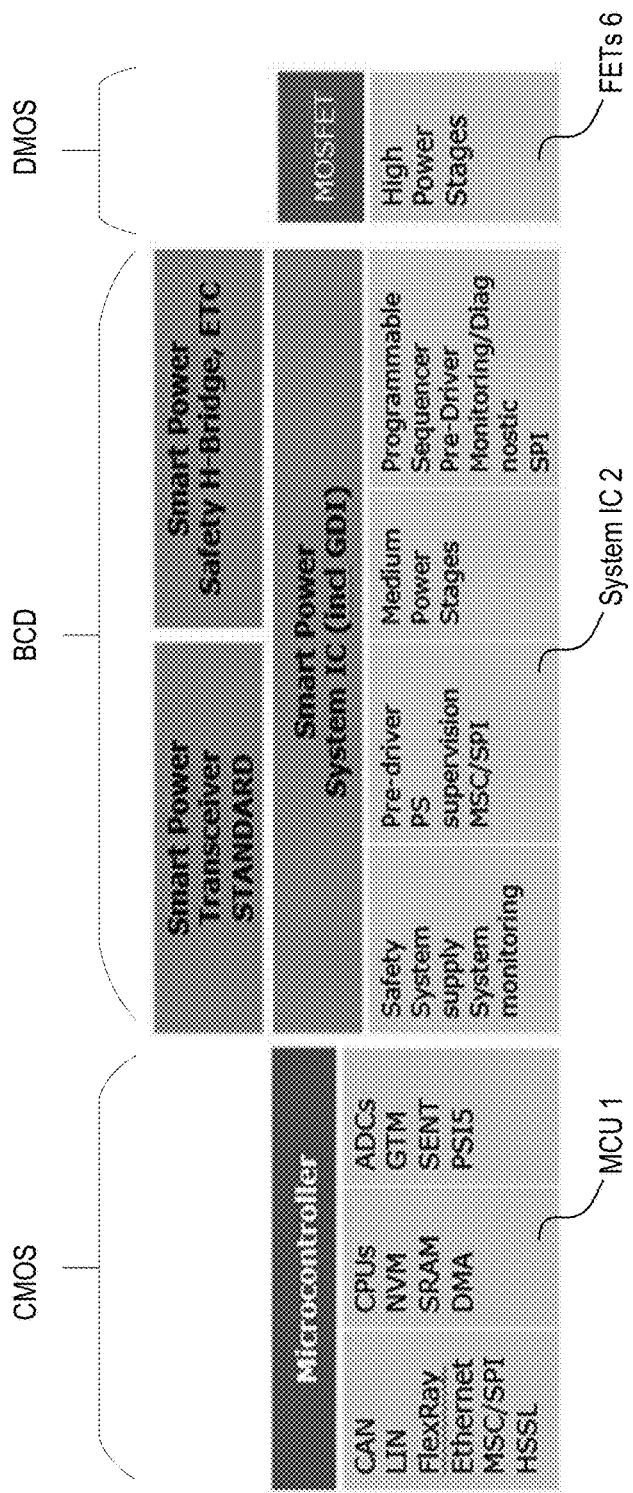
FIG. 6 summarizes the functions provided by an ECU and how these functions are distributed among microcontroller and system IC, considering high level of integration for a potential next generation system IC including smart power stages and GDI drivers similar as shown in FIG. 3B.

FIG. 6 summarizes the above-described distribution of functions in ECUs, which are designed according to the existing approach described above. The microcontroller unit (MCU) 1 includes standard components (function blocks) such as CPUs (central processing units), volatile memory (e.g. SRAM) and non-volatile memory (NVM) as well as function blocks for direct memory access. The MCU 1 further includes function blocks for interfacing with sensors such as analog-to-digital converters (for digitizing analog sensor signals) and digital sensor interfaces like SENT (Single Edge Nibble Transmission) and PSI5 (Peripheral Sensor Interface 5). It further includes a general purpose timer (GPT) module, and communication interfaces for communicating with other electronic devices inside and outside the ECU. These communication interfaces may include the data layer for off-board communication like a CAN (Controller Area Network) interface, a LIN (Local Interconnect Network) interface, and a FlexRay interface, Ethernet, as well as serial interfaces for on-board connections such as SPI (Serial Peripheral Interface) and MSC (Microsecond Channel). As mentioned above, the core functions of the ECU, i.e. the functions necessary for controlling the engine, are implemented by software instructions executed by the CPUs.

A highly integrated system IC 2 (see also FIGS. 3B and 5) may include function blocks for providing power supply for the ECU, low-power and medium power semiconductor switches, monitoring and diagnosis functions, as well as pre-driver and driver stages for driving the fuel injectors, e.g. of a gasoline direct injection (GDI) engine, and various other actuators. A programmable sequencer may be used, e.g. to set a desired current-profile for the direct injection fuel injectors. The system IC 2 also includes communication interfaces such as MSC and SPI, basically for communicating with the MCU 1. Furthermore, it contains the physical layer circuitry (layers 1 and 2 of the OSI model) of the off-board communication interfaces (e.g. Ethernet, FlexRay, CAN, etc.). High power semiconductor switches are typically integrated in separate power electronic devices. As mentioned, the MCU 1 is fabricated using a CMOS process, the system IC is fabricated using a BCD process, and the discrete high power device(s) is (are) usually fabricated in a SFET process. And as can also be seen from FIG. 4, the System IC includes at least part of safety functions and power supply functions, as well as monitoring and diagnosis functions.

Figure 7:
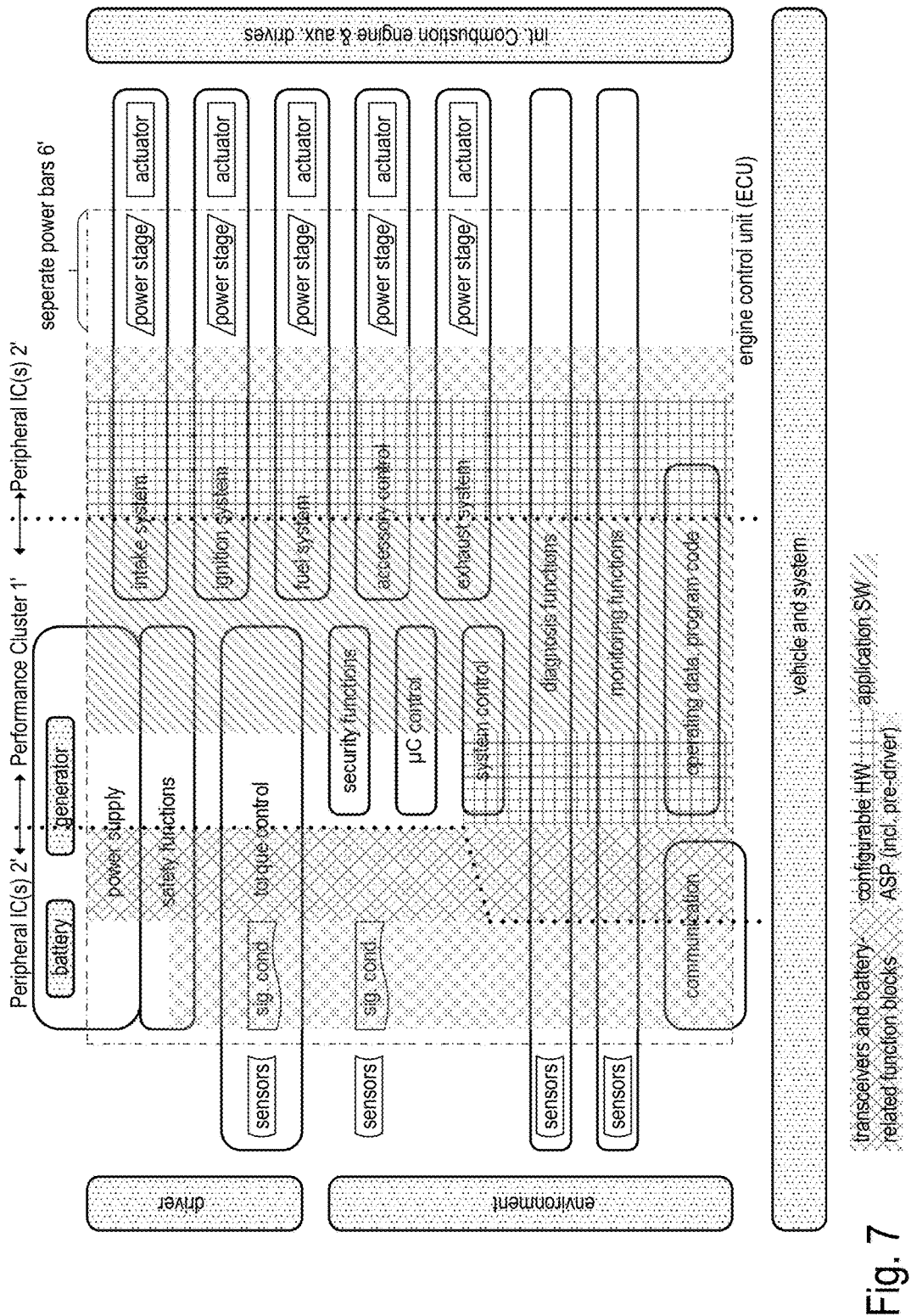
FIG. 7 shows the same diagram as FIG. 4 with a different, novel ECU hardware partitioning that breaks with the traditional ECU design approach.

As mentioned above, further pursuing the traditional approach of miniaturization and concentrating most of the auxiliary/supplementary functions in one highly integrated system IC and using a highly application specific MCU seems to bring no or only little progress. The embodiments described below are designed using a novel concept, which breaks with the traditional approach of ECU design and the traditional distribution of functions among MCU 1 and System IC 2. According the novel ECU design approach, the most of the functions, which are very specific to engine control are removed from the MCU, which is further referred to as Performance Cluster (PCL). The Performance Cluster is a high performance micro-controller that includes only a minimum of application-specific functions and easily could also be used in various other automotive applications. The previously described System IC is de-integrated into one or more ICs, further referred to as peripheral ICs (PICs), separate low-power and medium-power electronic switching devices (e.g. several MOSFETs included in one chip) and discrete semiconductor switches. The peripheral IC takes over the functions that have been removed from the MCU and are not further provided by the Performance Cluster. FIG. 7 illustrates a diagram very similar to the diagram of FIG. 4. The functions shown in FIG. 7 are the same as shown in FIGS. 2 and 4. Also the realization of these functions indicated by the different hatch-patterns (analog signal processing, application software, configurable hardware, transceivers and battery related function blocks) are the same as shown in FIG. 4. However, an essential difference between FIG. 4 (relating to the traditional ECU design approach) and FIG. 7 (relating to the novel approach described herein) is the "dividing line" along which the implementation of the various functions is partitioned between Performance Cluster, at the one hand, and Peripheral IC and further ICs, at the other hand. Accordingly, most of the configurable hardware (including timers, counters, sequencers, etc.) as well as the sensor interfaces, which previously have been a part of the MCU are now moved to the Peripheral IC(s).

Figure 8:
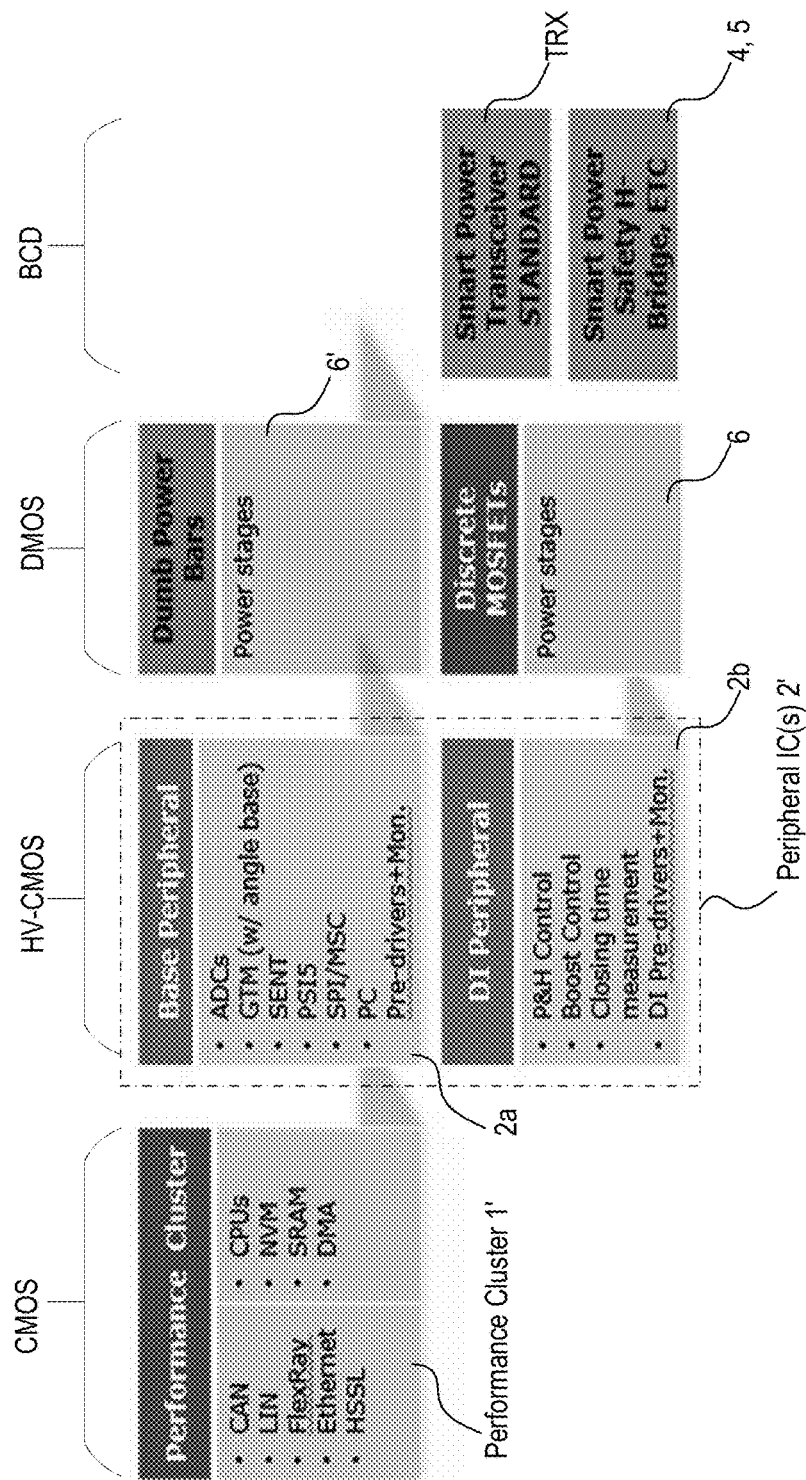
FIG. 8 illustrates how the functions provided by an ECU are rearranged to increase efficiency of the ECU design with regard to various aspects according to the novel ECU design approach described herein.

As can be seen in FIG. 8, one or more peripheral ICs 2' are employed instead of one highly, integrated system IC. All the low-, medium-, and high-power switches are realized as separate integrated or discrete power devices 6 and 6'. In the present example, the functions of the peripheral IC 2' is distributed by two ICs, the base peripheral IC 2a and a GDI peripheral IC 2b. However, both parts 2a, 2b could also be integrated in one IC 2'. As a consequence of the de-integration suggested herein, the peripheral ICs 2' do not need to provide power electronic functions and thus may be fabricated using a common HV-CMOS process instead of a more complex BCD process. The sensor interfaces (e.g. ADCs, SENT and PSI5 interface) have been removed from the MCU 1, which is now the Performance Cluster 1'. Those sensor interfaces are now included in the peripheral ICs 2', in the preset example in base peripheral IC 2a. The second, GDI peripheral IC 2b shown in FIG. 8 includes function blocks concerning the driving, monitoring and control of, for example, the fuel injectors for direct injection (DI) engines. In addition to the control of GDI injector valves, the peripheral IC 2b or a similar peripheral IC may be used to drive, monitor and control solenoids for other purposes, such for intake and exhaust valve control as well as current-controlled proportional valves.

The above-described approach (i.e. to separate base peripheral and GDI peripheral IC) may be chosen to stay in the sweet spot with regard to the semiconductor technology used to produce those ICs. The direct injection function usually uses a high voltage technology for typically 90V (e.g. HV-CMOS or BCD), whereas a 60V technology may be sufficient for other components. The GDI peripheral IC 2b and the base peripheral IC 2a (see also FIG. 15A) may communicate with a dedicated High Speed Serial Link (HSSL), which—in the traditional ECU design—can be employed for (a time-based and time-triggered) communication between the MCU 1 and an external GDI driver (see FIG. 3a, GDI driver 3a). Only a few components from the traditional ECU design are realized separately (ICs 4, 5, and TRX), in particular ICs, which implement safety-relevant functions, e.g. in case of the safety supply for some safety relevant ICs. In the present example of FIG. 8 these are functional blocks providing the electronic throttle control (ETC) and some other safety functions. Also those components, which are in direct contact with the automotive battery (the on-board power supply), may have to comply with rather strict requirements concerning EMC (electromagnetic compatibility). In many applications separate chips manufactured in BCD technology may be best suited to comply with these requirements. Nevertheless, most of the (low-power and medium-power) power stages, which are integrated in the system IC in the traditional ECU design, are de-integrated and realized as separate power stages 6' (using e.g. FINFET or RCB technology), and thus the need for a BCD technology is avoided for the peripheral ICs 2'.

As the application specific functions blocks needed for the engine control, in particular the mentioned sensor interfaces, have been removed from the microcontroller unit, a more generic microcontroller can be used. Flexibility and scalability are improved. The removal of the power semiconductor switches from the system IC helps to overcome limitations with regard to heat dissipation, which exist in the system IC according to the traditional ECU design. Generally, this re-partitioning of functional blocks (i.e. removal of sensor interfaces from the microcontroller, removing power electronics from the system IC) can reduce the overall complexity of the ECU and thus reduce costs for production and testing as well as time-to market are reduced. The size of the packages can be reduced by de-integration, which can reduce the space requirements on the PCB of the ICs. To illustrate this effect it is noted, that a QFP (Quad Flat Package) with 1440 pins needs almost twice the area than two QFPs with 64 pins each when using the same pin pitch.

Figure 9A:
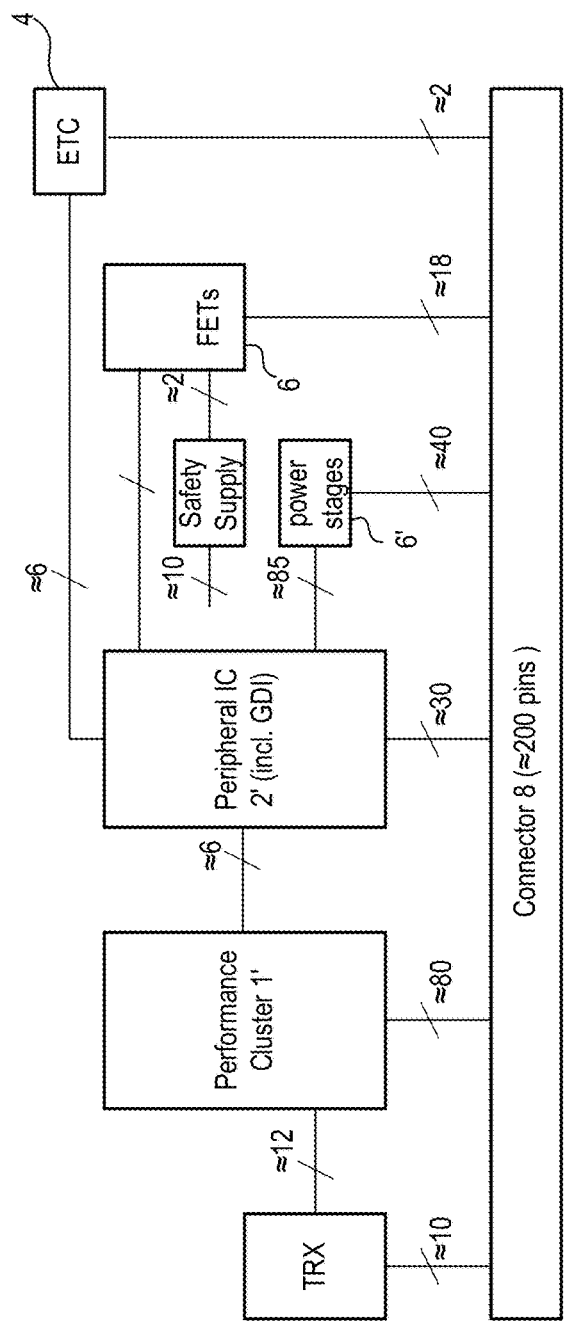
FIGS. 9A and 9B illustrate simplified block diagrams of circuit components arranged on the PCB of an ECU according to FIG. 8 and their interconnections, wherein in FIG. 9A GDI driver functions are integrated in a main peripheral IC and in FIG. 9B the GDI driver functions are integrated in a separate GDI driver IC.
Figure 9B:
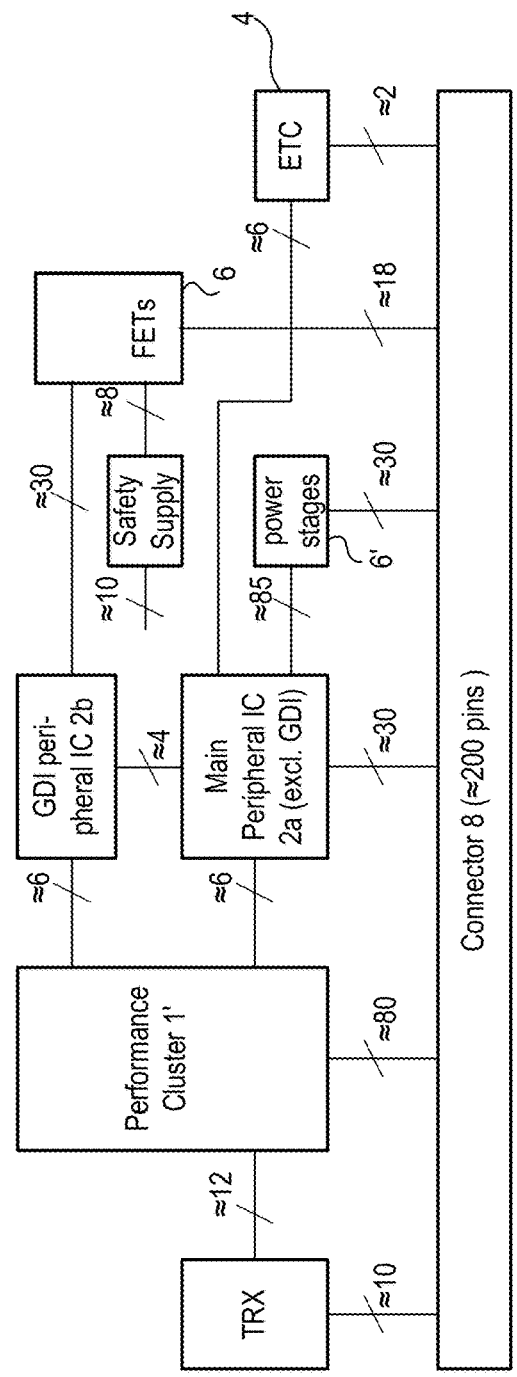

The FIGS. 9A and 9B illustrates schematically the interconnections of Performance Cluster 1', Peripheral IC 2', low-power and medium-power power stages 6', high-power semiconductor switches 6, as well as further ICs 4, TRX (which are separate for safety reasons as discussed above) as well as a connector 8 on a printed circuit board (PCB). In FIG. 9A the single peripheral IC 2' includes all the functions described with reference to FIG. 8 including the GDI driver functions, whereas the GDI driver functions are in a separate peripheral IC 2b in the case of FIG. 9B. The power supply ("safety supply") is implemented in a separate chip in order to maintain a safe power supply even in case other circuit components fail.

As mentioned above, the Performance Cluster 1' is now optimized with regard to computing power (for executing application software) and all the application specific peripheral interfaces (e.g. sensor interfaces such as SENT, PSI5, and analog interfaces) are integrated in one or more peripheral ICs (IC 2' or ICs 2a, 2b in case of FIG. 9B). As the sensor interfaces are in the peripheral IC 2', the sensor information is at least partly processed in the peripheral IC 2'. Sensor information (especially from crankshaft sensor 11 and camshaft sensor 12, which is crucial for engine control), which is needed in the Performance Cluster 1' as input for the monitoring and control algorithms (in general referred to as application software) executed by the Performance Cluster 1' is communicated from the peripheral IC 2' to the Performance Cluster 1' via a data bus 7. Similarly, the output data that is generated by the control algorithms executed by the Performance Cluster 1' and needed in the peripheral IC to drive actuators such as the fuel injectors (via power switches in IC 4b) is communicated back to the peripheral IC 2a via the data bus 7. Accordingly, the data bus 7 is a bidirectional bus. As mentioned above, the control of the actuators such as the fuel injectors is very critical and depends on the angular position of the crankshaft. Thus time and angle have to be well synchronized in the Performance Cluster 1' as well as in the peripheral IC 2', and, therefore, the high-speed bus has to be realtime capable and allow for a comparably fast data transmission. In the present embodiments a bidirectional real-time capable high-speed serial bus is used as data bus 7 to connect the Performance Cluster 1' and the peripheral IC 2a. With regard to timing, the Performance Cluster is the master device that is connected to a crystal oscillator 13 (XTAL), which provides a time base. As a consequence Performance Cluster 1' and the Peripheral IC 2' "see" the same absolute time. However, as will be discussed in more detail later, even a very fast data bus 7 is not able to communicate the sensed angle information directly to the Performance Cluster 1' in real time. Thus a specific mechanism will be necessary to synchronize angle information between the Peripheral IC 2' and the Performance Cluster 1', wherein the peripheral IC 2' is the master device with regard to angle measurement and angle synchronization information is regularly transmitted regularly from the peripheral IC 2' to the Performance Cluster regularly.

The de-integration of the sensor interfaces from the MCU has some significant consequences on the operation of the whole engine control unit (ECU), in particular with regard to the time/angle synchronization. In ECUs, which are designed in accordance with the traditional approach (see FIGS. 3 to 6), the MCU generates—based on a crystal oscillator—a clock signal, which is used as a time basis of the overall system (i.e. the ECU). That is, the MCU is the master device with regard to timing. The MCU combines the clock signal with the angle information that is provided by the crankshaft sensor 11 and the camshaft sensor 12 (see FIGS. 1 and 10) of the internal combustion engine. A complex angle estimation circuit (implemented by dedicated hardware, which may be software-configurable) accomplishes the time/angle synchronization with high precision by the prediction, interpolation and correction of the angle and time values regularly provided by the angular position sensor(s). Based on this time/angle synchronization, all control operations to be performed at the engine are calculated by the CPU included in the MCU. These control operations are triggered instantly by the MCU based on the clock signal and the mentioned time/angle synchronization. The mentioned time/angle synchronization is as such known and, for example, explained in the publication Leteinturier, P. and Benning, "*Enhanced Engine Position Acquisition & Treatment,*" SAE Technical Paper 1999-01-0203, 1999, which is hereby incorporated by reference in its entirety. The mentioned angular position sensor(s) provide signal(s), that are indicative of a specific angular position value (e.g. of the crank-shaft) at a specific time instant. An angular position sensor may, for example, generate a sensor signal composed of a sequence of pulses, wherein the time instant, at which a pulse occurs (e.g. the time instant of a rising edge of a pulse), indicates a specific increment of the angular position (e.g. 6°). That is, the pulses occur periodically with a specific periodicity (angle-period) of e.g. 6°, wherein the time-period between two subsequent pulses varies dependent on the angular velocity of the crank-shaft.

Figure 10:
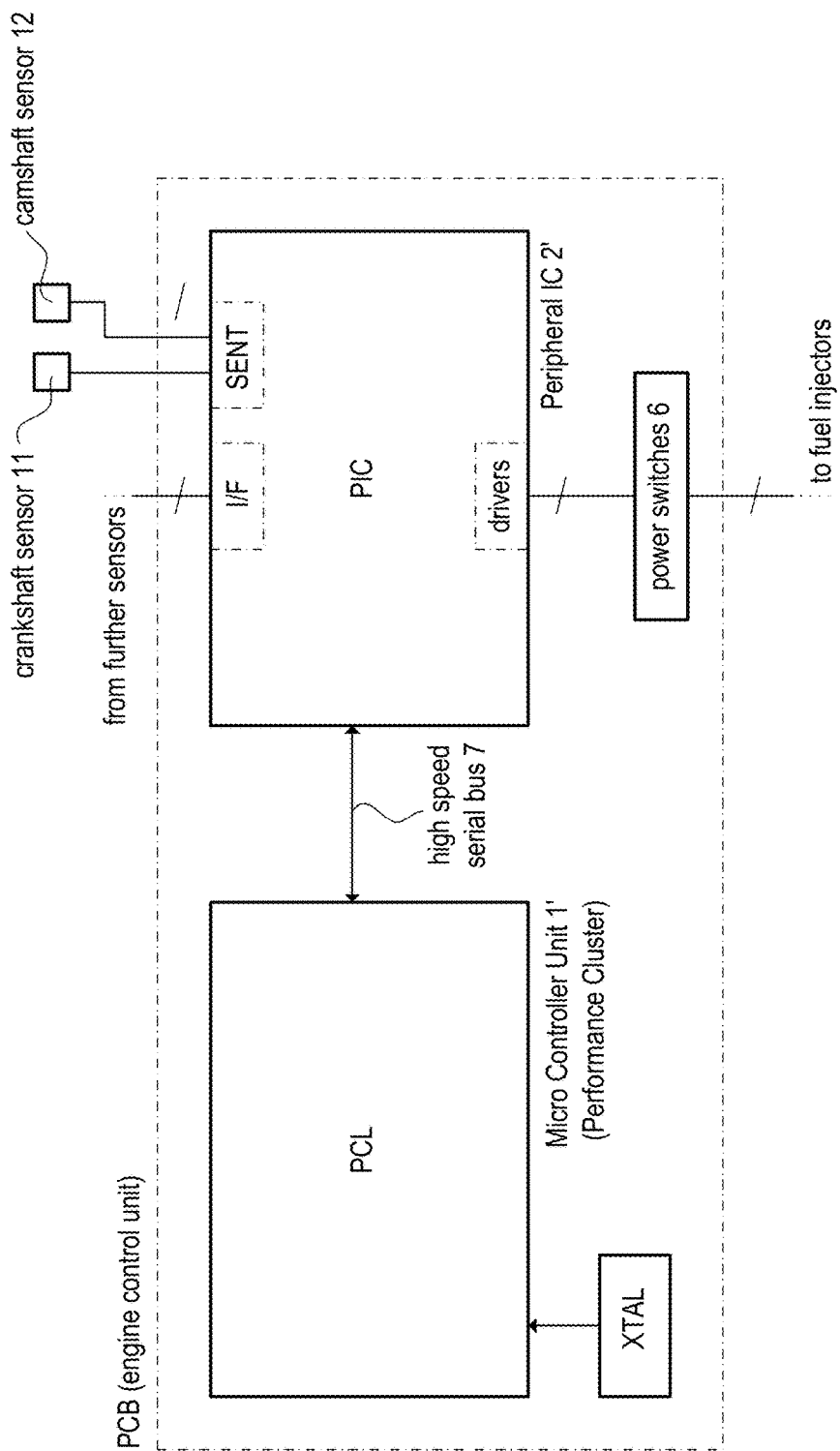
FIG. 10 illustrates the basic structure of an ECU in accordance with one embodiment.

When using the novel ECU design approach described herein (see FIGS. 7 to 10), the above described time/angle synchronization cannot anymore be done in the MCU, now referred to as Performance Cluster. As shown in FIG. 10, the reason for this is that—different from the traditional design—the sensor information from the crankshaft sensor 11 and the camshaft sensor 12 is not directly available in the Performance Cluster but primarily only in the peripheral IC. However, the angle estimation circuit cannot simply be moved to the peripheral IC 2' (or 2a in case of FIG. 9B) because the estimated time and angle values determined by the angle estimation circuit cannot be transmitted to the Performance Cluster 1' via the data bus 7 fast enough. In accordance with the novel design approach described herein the angle estimation circuit is distributed among the Performance Cluster 1' and the peripheral IC 2'. Accordingly, a master angle estimation circuit is provided in the peripheral IC 2' and a slave angle estimation circuit is provided in the Performance Cluster 1', wherein the master angle estimation circuit in the peripheral IC regularly (in each angle-period) transmits predicted (by extrapolation) a starting angle A^ (e.g. in degree) and a corresponding predicted time instant T^ for the next angle-period (e.g. defined by the tooth pitch of the tooth-wheel, typically 6°), a predicted angular velocity V^ and angular/time delay values, which are used as correction values by the slave angle estimation circuit in the Performance Cluster (see also FIGS. 12A-12C and corresponding explanations below). Thereby the pair of predicted angle A^ and time T^ includes the acceleration information determined during the preceding angle-period. Based on the information received from the master angle estimation circuit, the slave angle estimation circuit in the Performance Cluster can separately interpolate angular values (so-called micro-ticks, µTi) as described below in more detail, and the Performance Cluster may then process these interpolated time and angle values (micro-ticks) in a conventional manner using know engine control algorithms executed by the CPU of the Performance Cluster.

Figure 11:
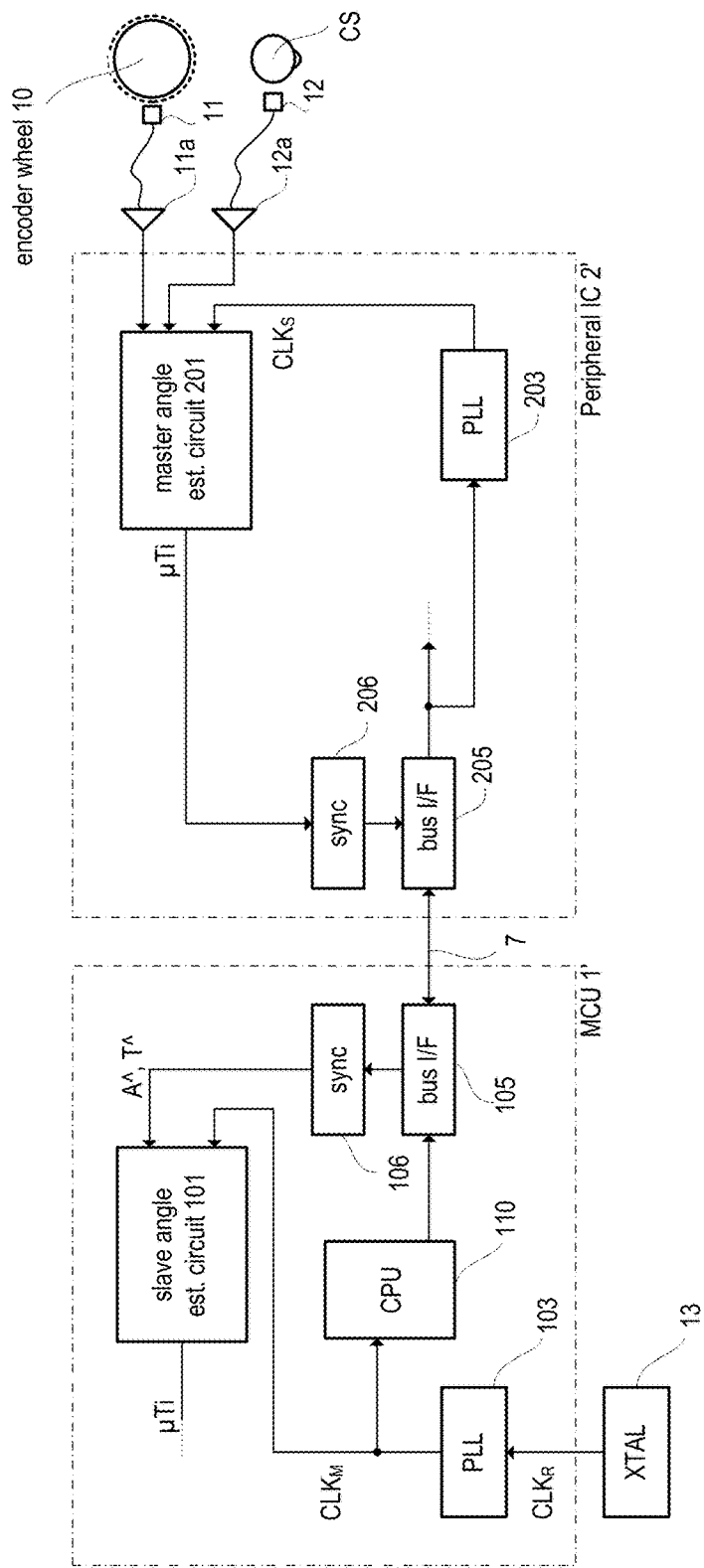
FIG. 11 illustrates the embodiment of FIG. 10 in more detail.

FIG. 11 illustrates a simplified example of an ECU composed of, inter alia, first circuitry, which implements the Performance Cluster 1' (performance cluster, see FIG. 10), and second circuitry, which includes at least one peripheral IC 2'. As mentioned above, the Performance Cluster 1' is the master device with regard to timing, whereas the peripheral IC 2' is the slave device. Accordingly, the Performance Cluster 1' is coupled with an oscillator (e.g. a crystal oscillator XTAL) that provides a stable reference clock signal $CLK_R$ for the Performance Cluster 1'. The Performance Cluster 1' includes a clock generation circuit 103 that generates a mater clock signal $CLK_M$, which is provided to all clocked circuitry on the Performance Cluster 1' such as, e.g., the CPU 110. The clock generation circuit 103 usually includes a phase locked loop (PLL), which may be implemented in any conventional manner. The Performance Cluster 1' further includes a bus interface 105 for the mentioned bidirectional real-time high-speed serial bus 7, which allows real-time data exchange between peripheral IC 2' and the Performance Cluster1' (see also FIG. 10). The peripheral IC 2' includes a corresponding bus interface 205 connected to the bidirectional real-time high-speed serial bus 7.

All clock signal in the Performance Cluster 1' are based on the master clock signal $CLK_M$ and thus in a fixed phase relation to the reference clock signal $CLK_R$ provided by the crystal oscillator 13. That is, the bus clock signal used to clock the data transmission across the data bus 7 is also synchronized with the master clock signal $CLK_M$ and thus with the reference clock signal $CLK_R$. In order to synchronize the operation of the circuitry in the peripheral IC with the master clock signal in the Performance Cluster 1', the peripheral IC 2' also includes a clock generation circuit 203, which uses the bus clock of the serial bus 7 as a reference to generate a slave clock signal $CLK_S$ in the peripheral IC 2'. The clock generation circuit 203 may also include a PLL (e.g. a digital PLL, DPLL) and operate in a similar manner as the clock generation circuit 103 of the Performance Cluster 1'. As a consequence, the slave clock signal $CLK_S$ in the peripheral IC 2' is synchronized (via the bus clock) with the master clock signal $CLK_M$ in the Performance Cluster 1', which ensures that the peripheral IC 2' operates substantially in synchronization with the Performance Cluster 1'.

As explained above, the slave clock signal $CLK_S$, which is provided to all clocked circuitry of the peripheral IC 2', is locked to the master clock signal $CLK_M$ of the Performance Cluster 1'. While the Performance Cluster 1' is the master device with regard to timing, the peripheral IC 2' is the master device with regard to the angle, i.e. the angular position and velocity of the crank-shaft. Accordingly, the peripheral IC 2' includes a master angle estimation circuit 201 whereas the Performance Cluster 1' includes a respective slave angle estimation circuit 101. The master angle estimation circuit 201 receives the angle information provided by the externally connected angle sensors, i.e. by the crank-shaft sensor 11 and the camshaft sensor 12. The angle sensors may be connected to the peripheral IC 2' in any conventional manner. In the present example, the peripheral IC 2' includes a SENT interface 220 to receive angle information from the sensors 11, 12.

The angle sensors 11, 12 usually do not provide the angular resolution, which is needed to accomplish the control tasks implemented in the ECU with sufficient quality. In today's engine control systems the crankshaft-sensor 11 generates one pulse each 6 degree (corresponds to the mentioned angle-period). With an angle period of 6 degrees a full revolution has 60 angle-periods, wherein usually 58 pulses are generated instead of 60 pulses per revolution, as two pulses are omitted in order to detect the zero position of the encoder wheel coupled to the crankshaft. However, a resolution of 6 degrees is far too low to precisely control the engine operation, in particular to control the operation of the fuel injectors (see FIG. 1). Therefore, the master estimation circuit 201 is configured to generate interpolated pulses—so-called micro-ticks (µTi)—between the pulses provided by the crank-shaft sensor 11. This μTi generation is as such known (see, e.g., the above mentioned publication *SAE Technical Paper* 1999-01-0203) and therefore not explained here in detail. In essence, a digital phase locked loop (DPLL) is used to generate the micro-ticks.

The following explanations refer to the diagrams in FIGS. 12A to 12C, wherein FIG. 12A relates to the case, in which the angular speed is constant (angular acceleration is zero), FIG. 12B relates to the case, in which the angular speed decreases (angular acceleration is negative) and FIG. 12C relates to the case, in which the angular speed increases (angular acceleration is positive). However, before explaining FIGS. 12A-12C in more detail, some general considerations follow. In General, the μTi generation can be seen as a kind of angle prediction or estimation, which is only exact when the engine is in a steady state (i.e. has a constant angular velocity). In case the angular velocity is not constant (e.g. at positive or negative angular acceleration) it is, however, possible to predict (estimate) the time instant, at which the next 6° sensor pulse will occur, or, in other words, to predict the angular velocity for each angle-period. The time instant of the next pulse of the crankshaft sensor (or the angular velocity during an upcoming angle-period) can be predicted based on the current velocity and acceleration value obtained based on the sensor pulses (received after each 6 degree of rotation), which have been already detected. In essence, when a pulse from the crankshaft sensor is received, the duration of the period to the next occurrence of a pulse (e.g. 6 degrees later) is estimated by extrapolation based on the current angular velocity and acceleration and the μTi generation can be tuned accordingly. That is, the pulse-frequency of the μTi is set based on the estimated angular velocity. Based on the sensor pitch (e.g. 6 degrees) and this predicted duration between a current sensor pulse and the subsequent sensor pulse (i.e. 6 degrees later) an equivalent angular velocity can be determined (predicted duration divided by pitch) for the current period. If the acceleration or deceleration of the engine changes within this predicted period, the angular position indicated by the (counted) number of μTi and the angular position indicated by the actual pulse received from the crankshaft sensor do not match and the angular position indicated by the counter has to be corrected. If the angular velocity of the engine has increased during the predicted period, the μTi counter has counted too slow and thus cannot complete the desired number N of μTi until the end of the actual period (which is shorter than the predicted period) and some μTi are "lost". Accordingly, the speed of the μTi counter (representing the measured and interpolated angular crankshaft position) is increased for the next period to compensate for the lost μTi. If the angular velocity of the engine has decreased during the predicted period, the μTi counter has counted too fast and thus generates the desired number N of μTi before the actual end of the period (which is longer than the predicted period) is reached. Accordingly, the μTi counter (representing the measured and interpolated angular crankshaft position) is paused until the end of the actual period to correct the overestimated angular position.

In four-stroke internal combustion engines, the angular position measurement may be done in intervals of 720 degrees, which corresponds to two full revolutions of the crank-shaft. In order to distinguish between the first and the second revolution of a 720 degree period, the information obtained by the camshaft sensor 12 is used, as the camshaft only performs one revolution during one 720 degree period of the crankshaft. That is, the crank-shaft rotates twice as fast as the camshaft while both are coupled via a cam chain or a cam belt. The number N of μTi generated within one (e.g. 6 degree) period of the crank-shaft sensor may depend on the control algorithms used in the ECU. An exemplary number of N=64 μTi per period of 6 degrees would result in a theoretic resolution of 0.09375 degrees.

In view of the general considerations above, one specific example is explained in more detail with reference to FIG. 12A, which illustrates a case, in which the angular velocity is constant and, therefore, the angular velocity for an upcoming angle-period can be well predicted based on the velocity of the previous period. In the present example, it is assumed that the crank-shaft sensor (see FIG. 1, sensor 11) uses an encoder wheel that has a pitch of 6 degrees. That is, the sensor 11 generates a sensor pulse after each angle increment of 6 degrees, so that 60 pulses are generated during one full revolution of the crank-shaft. In fact, only 58 pulses are generates in many application because two pulses are left out (producing a "gap") to enable zero-point detection. FIG. 12A includes twelve timing diagrams. The first (top) diagram illustrates the pulse chain generated by the crank-shaft sensor 11. The individual pulses are denoted as $P_n$, wherein n is an index running from 0 to 59 (in case of a 6° pitch). The temporal spacing of the pulses $P_{n-6}$, $P_{n-5}$, $P_{n-4}$, etc. depends on the angular velocity, i.e. an angle of 6° corresponds to a time of 6°/V, wherein V is the angular velocity in degrees per second. The second timing diagram illustrates the sensor signal (pulse chain) using a magnified time scale.

In any practical implementation, the real sensor signal is not perfect and subject to errors. As shown in the second timing diagram, the rising and falling edges of the individual pulses have significant rise and fall times that may vary due to noise and tolerances of the electronic components used in the sensor electronics. Furthermore, the angular spacing between two neighboring pulses (e.g. $P_{n-4}$ and $P_{n-3}$) is not necessarily precisely 6 degrees but may vary due to mechanical (geometric) errors of the encoder wheel. Further sources of errors may be noise, signal propagation times, the mentioned tolerances of electronic components in the sensor electronics, etc. Due to these errors the pulses may exhibit a jitter $d_{JIT}$ with respect to the—theoretic—ideal sensor signal shown in the third timing diagram of FIG. 12A.

The mentioned errors may be (at least partially) corrected by common methods, which are as such known and thus not discussed in details therein. For example, the mechanical tolerances of the encoder wheel (i.e. deviations from the ideal 6° pitch) may be corrected using calibration data stored in a memory. Various methods to compensate the error (the jitter) may be applied, such as static or temporal calibration data from memory but also dynamic correction using e.g. extrapolation and/or interpolation methods. Generally, the correction process is completed within a time span $d_{CORR}$ following a sensor pulse generated by the crank-shaft sensor. The fourth diagram, illustrates the corrected sensor signal, whose pulses indicate an angle increment of exact 6° (if neglecting remaining errors that could not be corrected). In the present example, the corrected sensor pulse occurs exactly at the end of the time span $d_{CORR}$. However, it should be noted that the time span $d_{CORR}$ denotes a time window, throughout which the rising edge of the corrected pulse can occur at any time (dependent on the actual correction value). Therefore, the time span $d_{CORR}$ can also be regarded as a maximum delay between the actual sensor signal (second timing diagram of FIG. 12A) and the corrected sensor signal (fourth diagram of FIG. 12A). The further synchronization process between the master angle estimation unit 201 and the slave angle estimation unit 101 (see FIG. 11) is based on that corrected sensor signal.

The rising edge of the corrected sensor signal triggers a counter (µTi counter) which generates a µTi in each counter cycle. In the present example the counter starts at a predefined value (e.g. 15) and counts down to zero, to subdivide one 6 degree period into 16 micro-ticks (µTi). In this example, which is illustrated in the fifth diagram of FIG. 12A, one µTi would correspond to 0.375 degrees. The counter clock, which determines the counting speed of the µTi counter may be adjusted in each cycle based on an estimated angular velocity value $V\hat{\ }$. This estimation may be based on the pitch of the encoder wheel (e.g. 6°) and the temporal distance between the current pulse (e.g. $P_{n-4}$) and the preceding pulse (e.g. $P_{n-5}$). In the present case of a steady state (no acceleration) this estimation is comparably precise and the time, which the µTi counter needs to count down to zero, exactly fits into the time span between the current pulse (e.g. $P_{n-4}$) and the subsequent pulse (e.g. $P_{n-3}$). The resulting µTi signal is illustrated in the sixth timing diagram of FIG. 12A.

The mechanism for µTi generation as explained above is essentially performed in the master angle estimation unit 201. To allow a similar µTi generation at the Performance Cluster's side (i.e. in the slave angle estimation unit 101) angle and velocity information is regularly transmitted from the master angle estimation unit 201 to the slave angle estimation unit 101 via the real-time capable serial bus 7. In the present example, an estimated tripel $A\hat{\ }$, $T\hat{\ }$, $V\hat{\ }$ (including an estimated angle value $A\hat{\ }$, a corresponding time value $T\hat{\ }$ and a corresponding angular velocity value $V\hat{\ }$) is transmitted to the slave angle estimation unit 101 via the real-time capable serial bus 7 at the beginning of each 6° pulse period Pn. In the slave angle estimation unit 101 a new period will begin at the angular position $A\hat{\ }$ at time instant $T\hat{\ }$, wherein the µTi counter clock is set based on the estimated angular velocity value $V\hat{\ }$. The time instant $T\hat{\ }$ is calculated based on the current absolute time and a maximum data transmission time (dDTD), which it may take to transmit the angle and velocity information (i.e. $A\hat{\ }$, $T\hat{\ }$, $V\hat{\ }$) to the slave angle estimation unit 101 via the real-time capable serial bus 7. The data transmission time dDTD is illustrated in the seventh diagram of FIG. 12A. At time instant $T\hat{\ }$ (corresponding to an angle $A\hat{\ }$) a new period is triggered in the slave angle estimation unit 101 and the clock rate for the µTi counter is adjusted based on the estimated angular velocity $V\hat{\ }$. Theoretically, the sensor signal could be reproduced in the slave angle estimation unit 101 (See eighth timing diagram of FIG. 12A), wherein a rising edge of the reproduced sensor signal occurs at time $T\hat{\ }$. However, this signal is only included in FIG. 12A for illustrative purposes and is not needed in the current embodiment. The ninth and tenth timing diagram show the count-down of the µTi counter and the corresponding sequence of µTi in the slave angle estimation unit, which may be implemented in the same way as in the master angle estimation unit. The time lag of the µTi sequence in the slave angle estimation unit (tenth timing diagram of FIG. 12A) with respect to the µTi sequence in the master angle estimation unit (fifth timing diagram of FIG. 12A) corresponds to the maximum transmission time delay dDTD. This time lag is, however, considered in the estimation of the angle $A\hat{\ }$ which is transmitted via the serial bus 7.

The timing diagrams of FIG. 12B illustrate the µTi generation mechanism in a situation, in which the engine decelerates (negative acceleration) and the pulses $P_n$ of the sensor signal are received later than in the steady-state case (no acceleration). That is, the duration of the pulses in the sensor signal (see first and second timing diagram on FIG. 12B) increases during the deceleration phase. The fourth timing diagram of FIG. 12B shows the ideal sensor signal with an ideal 6° pitch (without errors). As explained before with reference to FIG. 12A, the real sensor signal (second timing diagram of FIG. 12B) may exhibit some jitter $d_{JIT}$, which can be corrected within a time window $d_{CORR}$ (see fifth timing diagram of FIG. 12B). In this regard, reference is also made to the steady state example discussed with reference to FIG. 12A. As mentioned above, the duration of the sensor pulses increases and thus the rising edge of the pulse $P_{n-3}$ lags behind by a time lag $d_{ERR}$ as compared with the steady state case (see third timing diagram of FIG. 12B).

The µTi generation is done the same way as in the previously discussed steady state case. However, because the clock rate of the µTi counter is set based on an estimated velocity, which is basically an extrapolation of the average velocity during the preceding 6° period, the µTi counter counts too fast (as the engine decelerates) and reaches zero at a time, which is about $d_{ERR}$ before the next pulse of the sensor signal. As each 6° period is subdivided into an equal number of µTi the counter has to be paused before starting a new "count-down" at the rising edge of the next pulse of the sensor signal (see the sixth and seventh timing diagram of FIG. 12B).

Analogously to the steady-state case, an estimated tripel $A\hat{\ }$, $T\hat{\ }$, $V\hat{\ }$ is transmitted from the master angle estimation unit 201 to the slave angle estimation unit 101 via the real-time capable serial bus 7 at the beginning of each 6° pulse period $P_n$. Based on the transmitted information, the sensor signal could be reconstructed at the Performance Cluster's side (see eighth and ninth timing diagram of FIG. 12B). The µTi generation is done as explained before in connection with the steady state case, wherein the clock rate of the µTi counter is set in accordance with the transmitted angular velocity value $V\hat{\ }$, which is an estimated value that is always too high during a deceleration phase. For this reason the same situation occurs as in the master angle estimation device 201 and the counter has to be paused until the next count-down starts in the subsequent period (see tenth and eleventh timing diagram of FIG. 12B).

The timing diagrams of FIG. 12C illustrate the µTi generation mechanism in a situation, in which the engine accelerates (positive acceleration) and the pulses $P_n$ of the sensor signal are received earlier than in the steady-state case (no acceleration). That is, the duration of the pulses in the sensor signal (see first and second timing diagram on FIG. 12C) decreases during the acceleration phase. The fourth timing diagram of FIG. 12C shows the ideal sensor signal with an ideal 6° pitch (without errors). As explained before with regard to the steady-state case (FIG. 12A), the real sensor signal (second timing diagram of FIG. 12C) may exhibit some jitter $d_{JIT}$, which can be corrected within a time window $d_{CORR}$ (see fifth timing diagram of FIG. 12C). As mentioned above, the duration of the sensor pulses decreases and thus the rising edge of the pulse $P_{n-3}$ is early by a time $d_{ERR}$ as compared with the steady state case (see third timing diagram of FIG. 12C).

The µTi generation is done the same way as in the previously discussed steady state case. However, because the clock rate of the µTi counter is set based on the estimated velocity, which is basically an extrapolation of the average velocity during the preceding 6° period, the µTi counter counts too slow (as the engine accelerates) and does not reach zero before the next pulse of the sensor signal is received from the sensor 11. Thus, some µTi are "missing" at the end of the current 6° period. As each period is subdivided into an equal number of µTi the clock rate of the µTi counter has to be temporarily increased to catch up for the missing µTi. When the counter has reached zero a new countdown follows immediately as shown in the sixth and seventh timing diagram of FIG. 12C.

Again, an estimated tripel A^, T^, V^ is transmitted from the master angle estimation unit 201 to the slave angle estimation unit 101 via the real-time capable serial bus 7 at the beginning of each 6° pulse period $P_n$ as discussed before with regard to the steady-state case. Based on the transmitted information, the sensor signal could be reconstructed at the Performance Cluster's side (see eighth and ninth timing diagram of FIG. 12B). The µTi generation is done as explained before in connection with the steady state case, wherein the clock rate of the µTi counter is set in accordance with the transmitted angular velocity value V^, which is an estimated value that is always too low during an acceleration phase. For this reason the same situation occurs as in the master angle estimation device 201 and the clock rate of the µTi counter has to be temporarily increased to catch up for missing µTi as explained above for the master angle estimation unit (see tenth and eleventh timing diagram of FIG. 12C).

The following description again refers to FIG. 11. As discussed above in detail, the high resolution angular position information obtained by the µTi cannot be shared with the Performance Cluster 1' via the data bus 7. For this reason, in the traditional ECU design, the sensors have been connected to Performance Cluster and the micro-tick generation has been performed by the Performance Cluster, which then used the µTi in the control algorithms. However, according to the novel ECU design approach described herein, a separate slave angle estimation circuit 101 is provided in the Performance Cluster 1', which operates in a similar manner as the master angle estimation circuit 201. However, instead of information from the crankshaft and camshaft sensors 11, 12, the slave angle estimation circuit 101 uses time, angle and velocity values A^ T^, V^ received from the master angle estimation circuit 201. Both, the clocks $CLK_M$ and $CLK_S$ of Performance Cluster 1' and, respectively, peripheral IC 2' are synchronized and thus Performance Cluster 1' and peripheral IC 2' "see" the same absolute time. Master and slave angle estimation circuits 201, 101 are regularly (e.g. once in each 6° period) synchronized with regard to angle information using the synchronization circuits 206, 106 in the peripheral IC 2' and the Performance Cluster 1', respectively, which are coupled by the bidirectional real-time data bus 7.

Figure 13A:
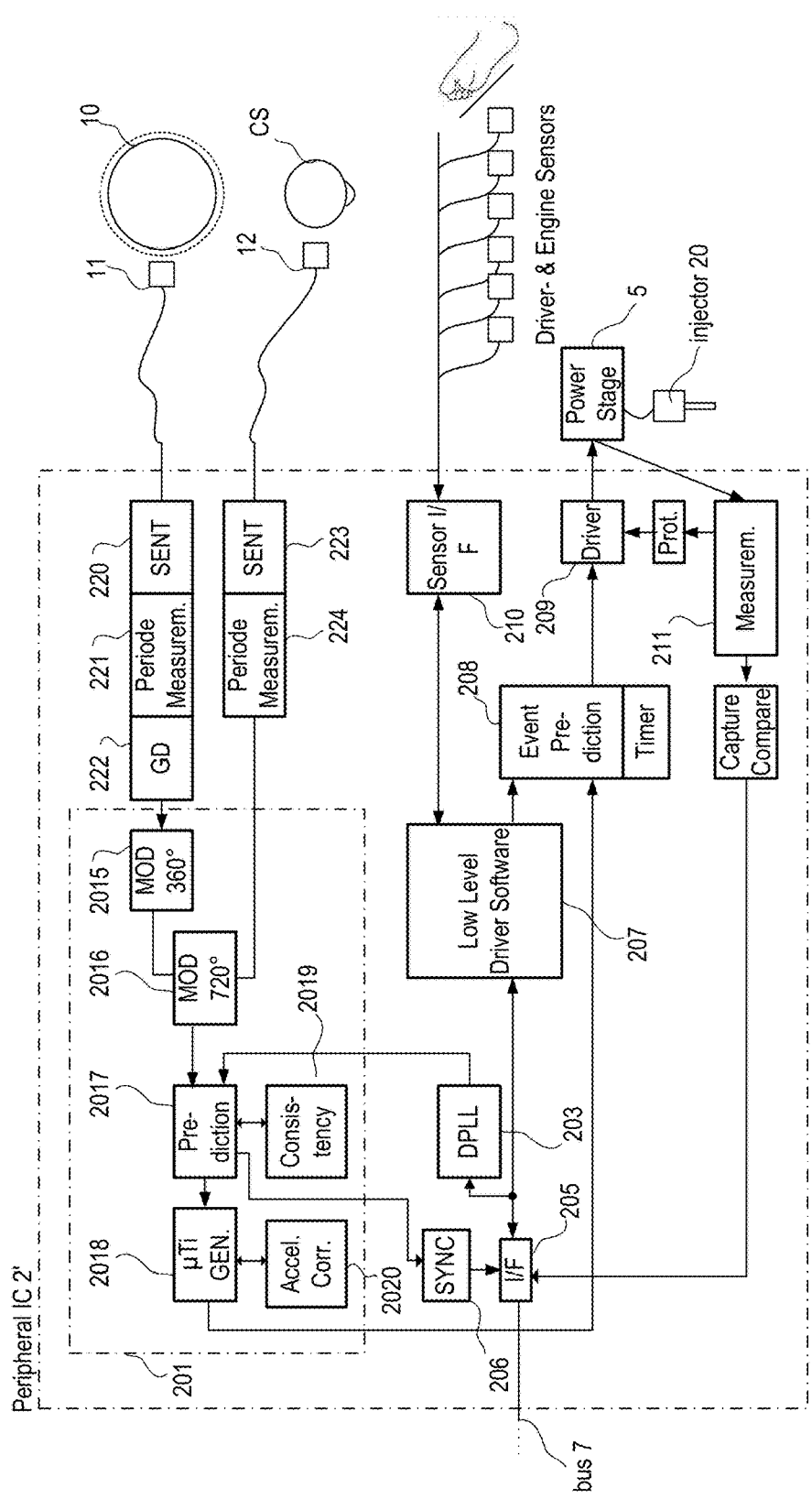
FIG. 13A illustrates one example of a peripheral IC in an ECU according to one embodiment.
Figure 13B:
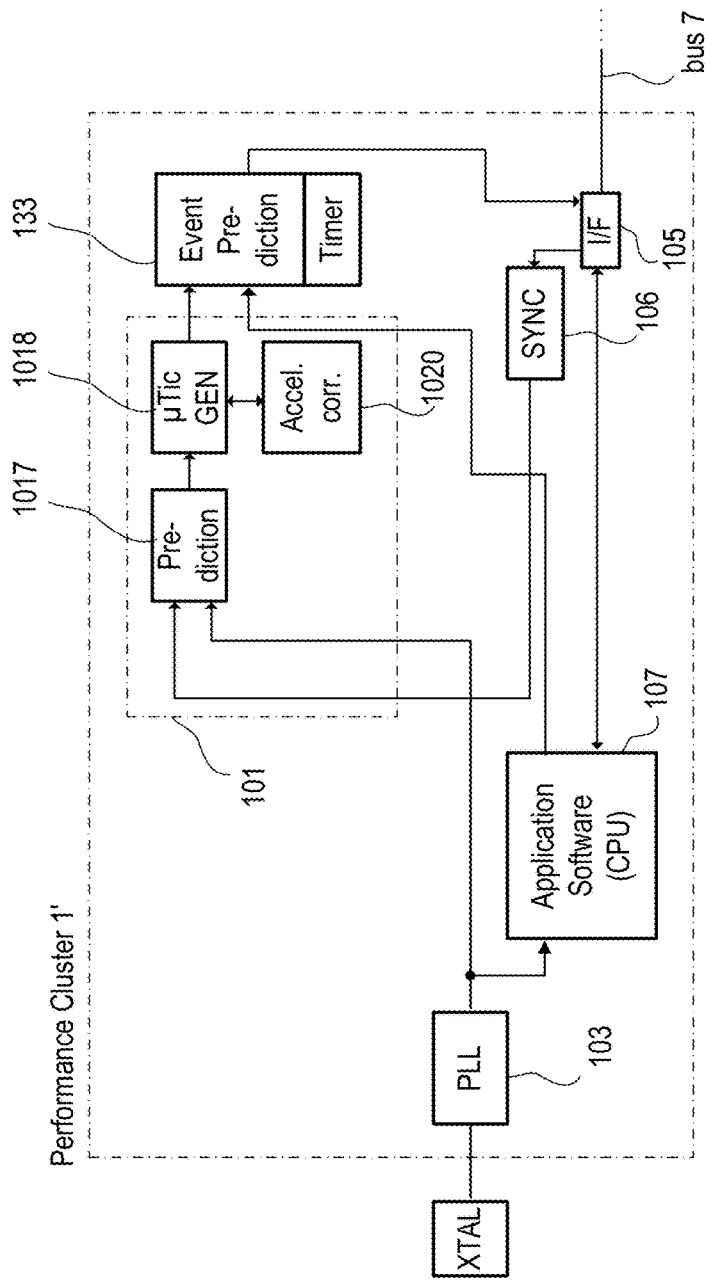
FIG. 13B illustrates one example of a micro-controller unit in an ECU according to one embodiment.

FIG. 13 illustrates an exemplary embodiment of an ECU that is designed according to the novel approach described above, wherein FIG. 13A illustrates the peripheral IC and FIG. 13B illustrates the Performance Cluster in more detail as compared to FIG. 11. As mentioned above, the sensors used for the engine control (e.g. crankshaft sensor 11, camshaft sensor 12, etc.) are connected to the peripheral IC 2', which, in the present example, also includes the functions needed for the gasoline direct injection. As already discussed with reference to FIG. 11, the peripheral IC 2' includes a bus interface 205 to allow communication with the Performance Cluster 1' via the bidirectional serial bus 7. All time and angle critical information is transmitted via the bus 7 as discussed above. Analysis show that that the bus should be capable to transmit data at transmission rate of about 70 Mbit/s (duplex). For example, the bus may use LVDS (low-voltage differential signaling) for signal transmission. The DPLL (digital PLL) 203 generates the slave clock signal $CLK_S$, which is phase locked to the master clock signal $CLK_M$ as discussed above with reference to FIG. 11.

The master angle estimation circuit 201 is illustrated in more detail in FIG. 13A. Accordingly, the crankshaft sensor 11 and the camshaft sensor 10 are connected to SENT interfaces 220 and 223. In essence one pulse is generated at a specific angular pitch, e.g. 6 degrees, for the crankshaft sensor 10, and 720 degrees for the camshaft sensor 12 (as the camshaft rotates at half the speed than the crankshaft). The functional blocks 221 and 224 perform the period measurement including error correction as discussed above with reference to FIG. 12. The functional block 222 performs the mentioned zero-point detection by detecting the gap of the encoder wheel (as mentioned two 6° periods may be left out to produce one 18° period each revolution). The master angle estimation circuit 201 includes a modulus 360° counter 2015 and a modulus 720° counter 2016 to cover all four strokes of the combustion engine (intake, compression, explosion, exhaust). The prediction unit 2017 is connected downstream to the modulus 720° counter 2016 and is configured to predict (calculate by extrapolation) the average angular velocity V^ during the current period, which is used to set the clock rate of the µTi counter as discussed before with reference to FIGS. 12A-C. The micro-tick generator 2018 includes the µTi counter that generates the µTi based on the predicted velocity value V^ for the current period. The functional block 2020 performs initiates the pausing of the µTi counter as discussed with reference to FIG. 12B and the temporary increase of the counter clock rate as discussed with reference to FIG. 12C to account for deceleration and acceleration of the engine. The functional block 2019 labelled "Consistency" is only needed in the master angle estimation circuit, and is configured to check whether the pulses received from the sensor (e.g. with a pitch of 6°) occur with a given realistic time window. If a pulse would occur outside this time window, the pulse is not plausible in view of the mechanical constraints of the engine (inertia) and can be disregarded. Dependent on the actual implementation of the crankshaft sensor erroneous pulses may be generated due to noise and other disturbances.

The synchronization unit 206 receives the values A^, T^ and V^ (e.g. from the prediction unit 2017) and encodes the values into a data frame that can be transmitted via the serial bus 7. The functional block 207 labelled "Low Level Driver Software" includes firmware which allows for receiving and transmitting data from and to the bus 7. The firmware is also configured to forward further sensor data (e.g. from the driver and engine sensors connected to the Peripheral IC) received by sensor interface 210 to the Performance Cluster, where the sensor data can be processed by the application software. The firmware is also configured to receive control commands concerning fuel injection sent to the Peripheral IC via the serial bus. The control commands may include, for example, information about the subsequent injection. To prepare the injection, the state machine 208 (labelled "event prediction") is programmed (configured) by the firmware and then triggers the injector—based on the µTi sequence—at a desired angular position of the crankshaft. The Peripheral IC may also include a driver stage 209 which is configured to generate driver signals (e.g. gate voltage signals) for the externally connected power stage 5 (e.g. power MOSFETs), which are coupled to the solenoid of an injector 20 to switch the injector current on and off. The functional block 211 labelled "Measurement" may be configured to receive feedback signals from the power stage 5 and/or the injector 20 and forward the measured information (e.g. the injector current during the latest injection) to the application software executed in the Performance Cluster (via bus 7) and/or the driver stage 209.

In FIG. 13B, the slave angle estimation circuit 101 also includes a prediction unit 1017 and a micro-tick generator 1018. However, the prediction unit 1017 regularly receives time, angle and angular velocity values $T^\wedge$, $A^\wedge$ and $V^\wedge$ from the master angle estimation circuit 201 via the data bus 7 instead from the sensors (crankshaft sensor 11 and camshaft sensor 12, see FIG. 1), and triggers the count-downs of the µTi counter (see FIG. 12A-C). The task of the synchronization unit 107 is basically the decoding of the data frame including the values $T^\wedge$, $A^\wedge$, and $V^\wedge$. The functional blocks 1018 and 1020 have essentially the same purpose than the corresponding functional block 2018 and 2020 in the peripheral IC's side. That is the functional block 1018 controls the temporary pause of the µTi counter (see FIG. 12B) in case of deceleration if the engine and temporary increase of the µTi counter clock rate (see FIG. 12C) in case of acceleration.

The engine control functions as such (core functions) are implemented in software (application software) and executed by the CPU 107 using appropriate software instructions. Particular with regard to fuel injection, the CPU 107 calculates based on various input data the next "event" such as the amount of fuel for the next injection and the angular position of the engine, at which the event is to be trigged. The angular position, at which an event is to be triggered may be communicated to the event prediction unit 133, which receives the µTi and initiates a respective actuation command at the command at the correct angular position. The event prediction unit 133 is basically the same as the event prediction unit 233 in the Peripheral IC and may be implemented as a finite state machine. A similar event is the ignition. The calculated information is forwarded to the function block 133 labeled "event prediction", which is configured to trigger the desired events (e.g. the actuation of a fuel injector) determined by the CPU 107 at the correct angular position based on the micro-ticks. The actuation command is then transmitted to the peripheral IC 2' via the serial bus 7 and further processed in the peripheral IC.

Figure 14B:
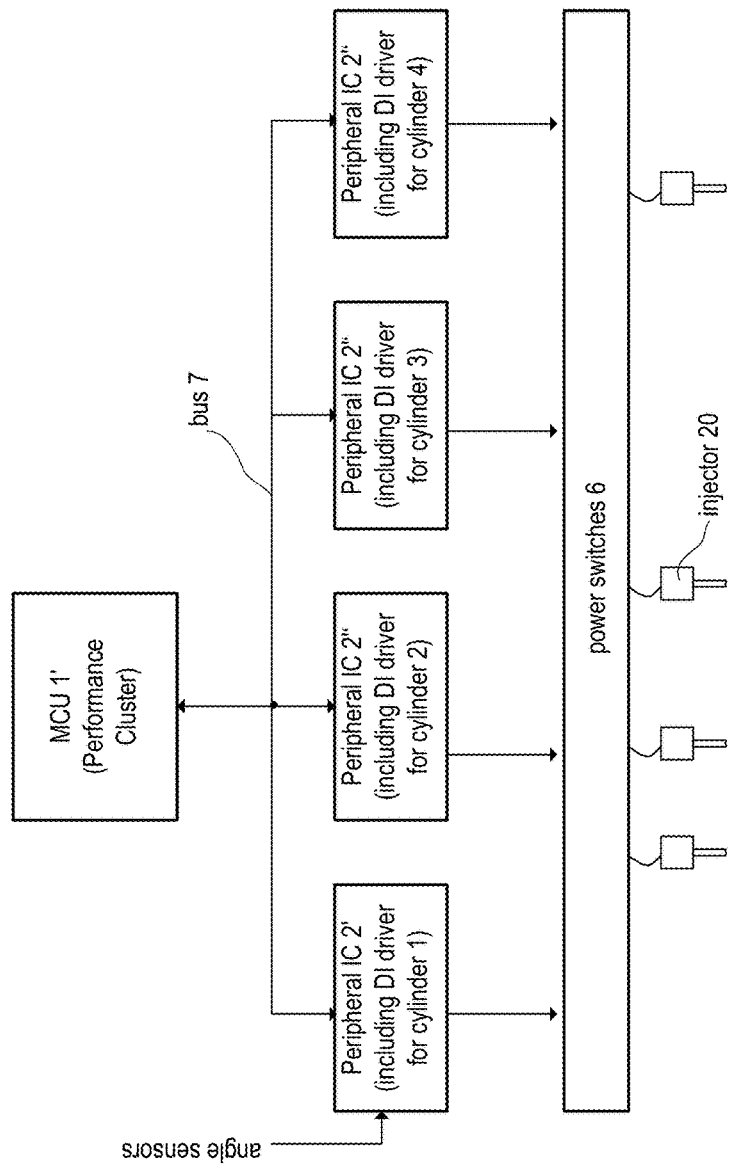
FIG. 14A to 14C illustrate three different examples of combining one or more peripheral ICs with one MCU (Performance Cluster) in one ECU.
Figure 14A:
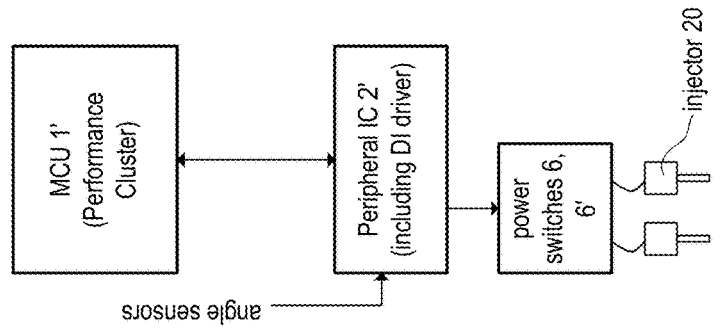
Figure 14C:
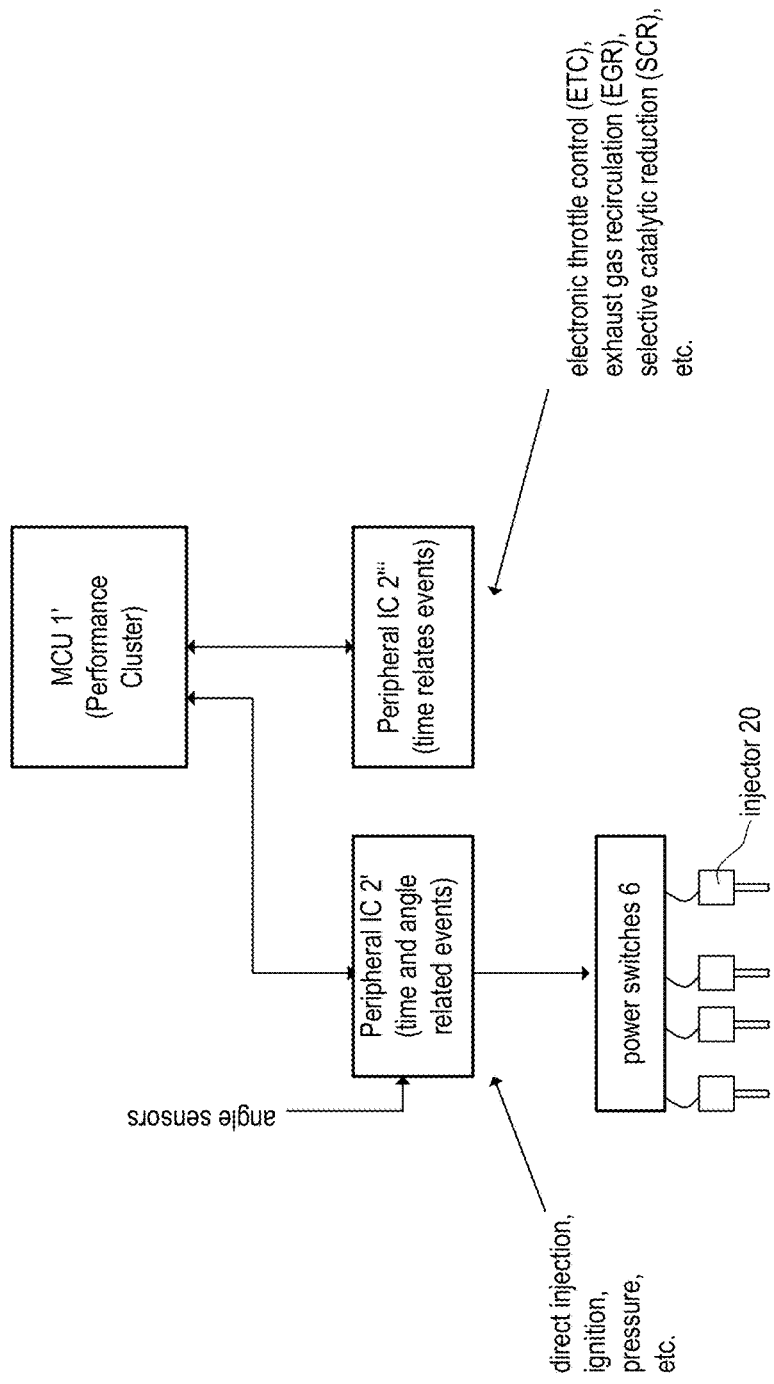

FIG. 14 illustrates three different examples of combining one or more peripheral ICs with one (single) Performance Cluster in one ECU. As illustrated before in FIGS. 9A and 9B the peripheral IC 2' may be—dependent on the application—split into separate ICs 2A and 2B (see FIG. 9B). In the following discussion, a single peripheral IC 2' is assumed. However, it is understood that this peripheral IC 2' could be easily replaced by two or even more peripheral ICs. FIG. 14A illustrates the case which has been discussed above, in which one Performance Cluster 1' is connected to at least one peripheral IC 2' in an ECU. In the Performance Cluster 1' the computation power is concentrated, wherein the sensors, particularly the angle sensors, are connected to the peripheral IC 2'. Performance Cluster 1' and peripheral IC 2' communicate (only) via a bidirectional high-speed real-time capable bus 7. The peripheral IC 2' may include the direct injection driver circuits (which may also be separate). For actually actuating the fuel injectors 20 external power switches 6 are used. FIG. 14B is essentially the same as FIG. 14A. However, in this example a separate peripheral IC 2' is used for each cylinder. The angle sensors are connected only to the peripheral IC 2' of the first cylinder, which thus includes the master angle estimation circuit as described with reference to FIGS. 11 to 13. The Performance Cluster 1' and the remaining peripheral ICs 2'' include the essentially the same slave angle estimation circuit. That is, the angle information used by the peripheral ICs 2'' is synchronized with the angle information available in the first peripheral IC 2'. Alternatively, different groups of two or more cylinders could be controlled by separate peripheral ICs. This example also illustrates that the angle synchronization as shown in FIGS. 12A-C is not necessarily done between Peripheral IC and Performance Cluster but also between two different Peripheral ICs. FIG. 14C illustrates a further option, according to which two peripheral ICs 2' and 2''' are used together with one Performance Cluster 1'. The peripheral IC 2' (e.g. including the GDI driver) is basically what has already been discussed with reference to FIGS. 9 to 13. That is, peripheral IC 2' implements all auxiliary and supplementary functions with regard to time and angle related sensor signals and actuator events (e.g. fuel injection, ignition, intake air pressure sensor, etc), whereas peripheral IC 2'' implements all auxiliary and supplementary functions with regard to only time related events (e.g. electronic throttle control (ETC), exhaust gas recirculation (EGR), selective catalytic reduction (SCR), etc.). In another example, a third peripheral IC (not shown) may implement common engine control functions, which neither require a highly precise timing nor a precise angle information. In any case, the peripheral ICs can communication with the Performance Cluster via the bidirectional high-speed real-time capable bus 7.

Figure 15A:
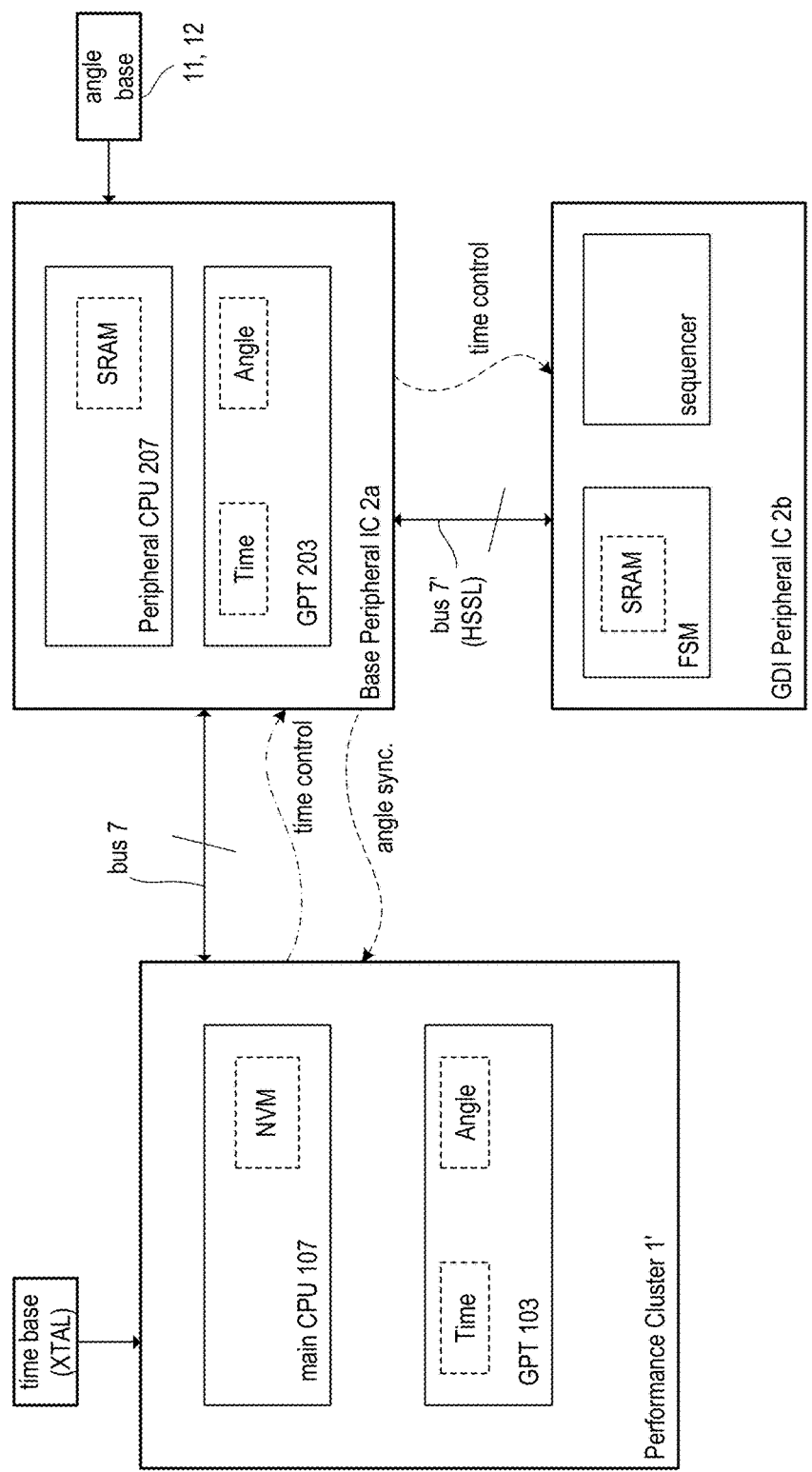
FIG. 15A to 15C illustrate three further examples of combining one or more peripheral ICs with one Performance Cluster in one ECU including the angle and time synchronization between the individual devices.
Figure 15B:
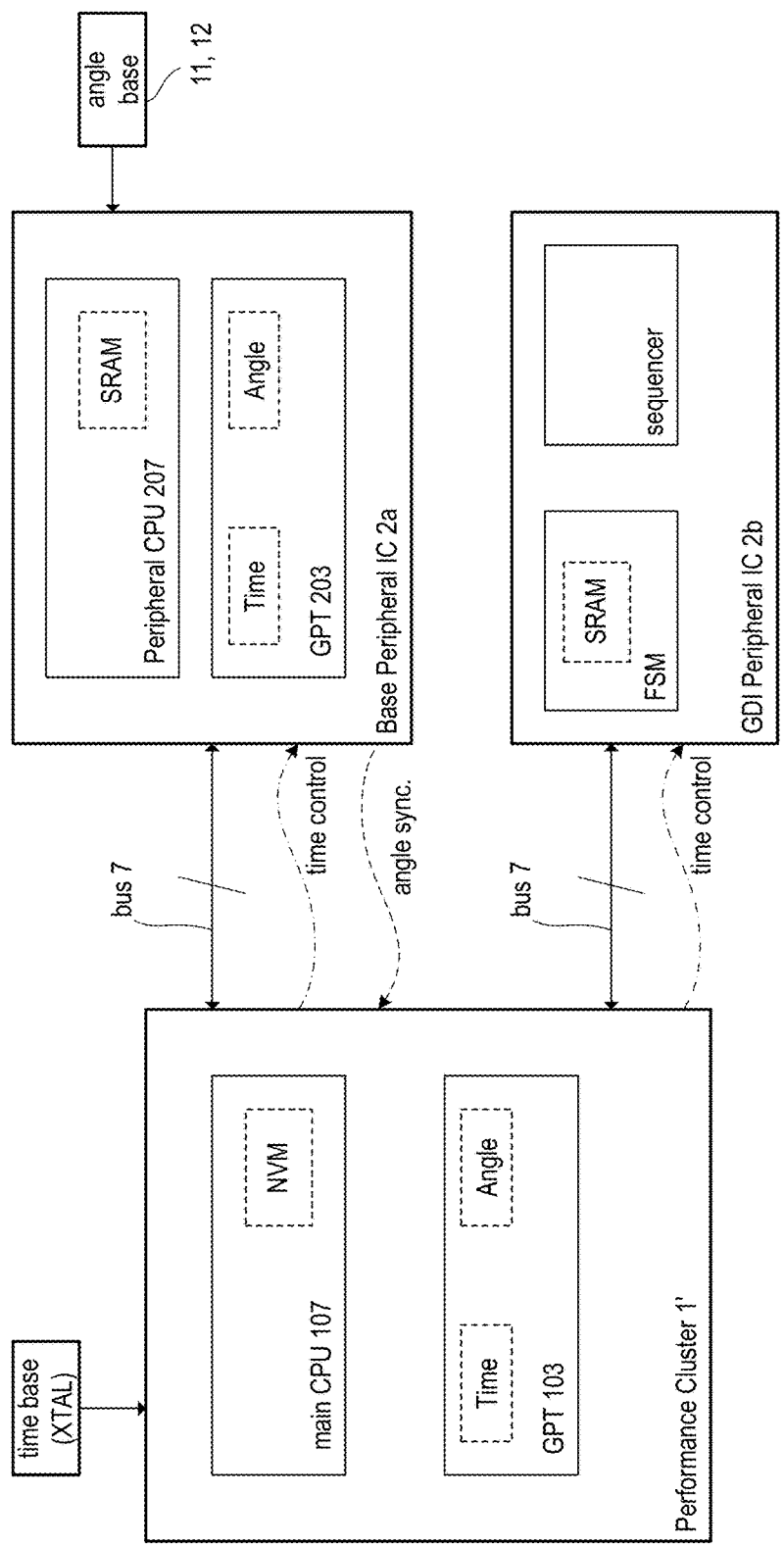
Figure 15C:
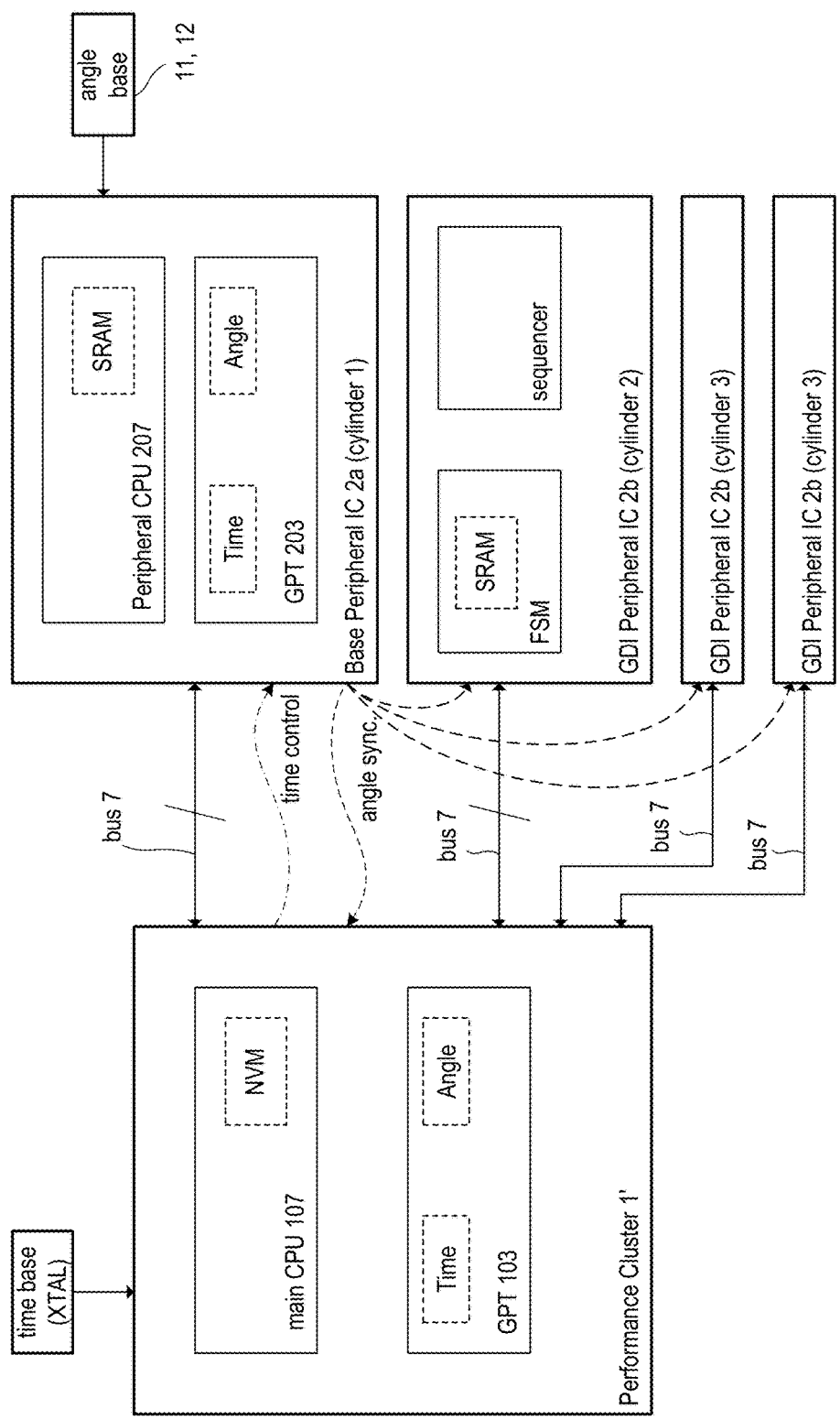

FIG. 15 illustrates further examples of how Performance Cluster 1' and Peripheral ICs can be interconnected and also illustrates the time and angle synchronization between the individual ICs. In the example of FIGS. 15A and 15B, the peripheral engine control functions are shared between the Base Peripheral IC 2a and the GDI Peripheral IC 2b, which includes only the driver stage for actuating the fuel injectors. The Base Peripheral IC 2a is connected to the angle sensors 11, 12 and includes the master angle synchronization unit, to which the corresponding slave angle synchronization unit in the Performance Cluster 1' synchronizes. The time base (oscillator XTAL) is connected to the Performance cluster 1', where it determines the operation of the (master) clock 103 (PLL, see also FIG. 11). The (slave) clock 203 (PLL, see also FIG. 11) is synchronized to the time base connected to the Performance Cluster 1' via the serial bus 7. The angle information is also regularly transmitted via the serial bus 7 as explained before with reference 10 FIG. 12A-C. In the example of FIG. 15A, the GDI Peripheral IC 2b is only time-triggered by the Base Peripheral IC 2a via another serial bus 7' (e.g. a HSSL, High Speed Serial Link) connecting the Peripheral ICs 2a and 2b. In the example of FIG. 15B the GDI Peripheral IC 2b is time-triggered by the Performance Cluster 1' via a second serial bus 7 connecting the Performance Cluster 1' and the GDI Peripheral IC 2b. The FIG. 15C is essentially the same as FIG. 14B wherein the angle synchronization between the Base Peripheral IC 2' (including GDI periphery for Cylinder 1) and the GDI Peripheral ICs 2'' (including GDI periphery for Cylinders 2, 3, and 4) is explicitly indicated.

Figure 16:
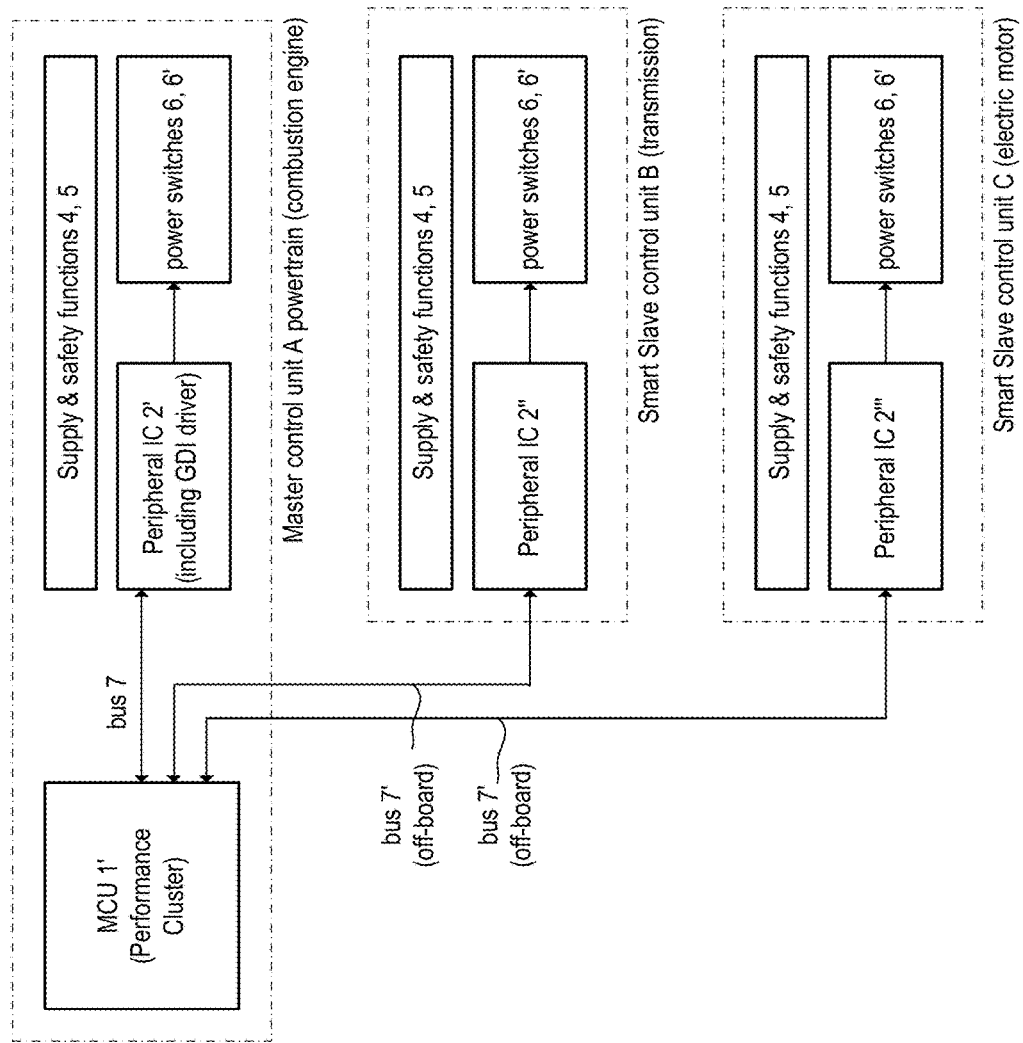
FIG. 16 illustrates a novel concept of master and slave ECUs communicating via one bidirectional high-speed real-time capable bus, wherein the master ECU includes a MCU and at least one peripheral IC and the slave ECUs include only peripheral ICs and further circuitry but not an MCU.

In the examples of FIGS. 14B and 14C and FIG. 15 two or more peripheral ICs are connected to one single Performance Cluster 1' via the bus 7, wherein all devices (Performance Cluster and peripheral ICs) are arranged on one PCB within one ECU. This concept can be generalized to a "domain structure" as shown in FIG. 16, in which several Peripheral ICs are connected to a Performance Cluster, which is not necessarily located on the same PCB but can also be arranged in a separate electronic control unit. Accordingly, one control unit takes over the function of a master control unit A, which includes a Performance Cluster and at least one peripheral IC as illustrated in the previous examples. This master control unit A may be the control unit for a first domain, for example, the powertrain master control unit, which takes care of the combustion engine control (ECU engine control unit). All other connected control units are "smart" slave control units, each of which fulfils a specific purpose. In the present example, the smart slave control unit B takes care of a second domain such as the transmission gear control, and the smart slave control unit C takes care of a third domain such as the electric motor control (e.g. in case of a hybrid vehicle). The smart slave control units do not include separate Performance Cluster and communicate (off-board) with the Performance Cluster of the master control unit A via the bidirectional high-speed real-time capable bus, which, in the present example, connects different PCBs in differently packaged control units arranged in different locations within an automobile. Basically, the peripheral ICs in the smart slave control units B and C "share" the Performance Cluster with the master control unit. Each smart slave control unit, may include one or more peripheral ICs, power switches to actuate external actuators, as well as one or more separate ICs which implement, for example power supply of the respective control unit and safety functions. It is noted, however, that the application software for the control functions performed by the individual smart slave control unit is concentrated in the Performance Cluster in the master control unit.

According to the traditional ECU design approach, the mentioned "sharing" of the MCU is not feasible, as the current MCUs used in engine control units are highly application specific MCUs. In contrast, the Performance Cluster according to the novel design approach is basically designed to provide computing power whereas (almost) all application specific hardware is concentrated in the peripheral ICs and separate power stages as discussed in detail above. Therefore, the Performance Cluster can easily be scaled for applications, in which various different Peripheral ICs (in different smart slave control units) are connected to the Performance Cluster to provide different control tasks in different domains of an automobile.

FIG. 16 shows one example, in which the domain "powertrain" of an automobile has been subdivided into the divisions "combustion engine", "transmission" and "electric motor". However, the illustrated concept (i.e. the domain structure and each domain including a master control unit and several smart slaves) may be easily transferred to other parts of an automobile, for example, body control, advanced driver assistance systems (ADAS), etc. as illustrated in FIGS. 17 A-D. Accordingly, the control tasks, which are to be accomplished in an automobile, are grouped into two or more domains. In the example of FIG. 17, the four domains "Driving", "Safety", "Body/Comfort" and "Infotainment" are used to group the control functions used in an automobile. Each domain includes a master control unit that has one Performance Cluster, which provides calculation power for all divisions of the respective domains. The divisions can be regarded as separate electronic control units, each including at least one Peripheral IC connected to the Performance cluster of the respective domain via a high-speed reals-time capable bus (see e.g. FIG. 16). The master control units of the individual domains may be connected via a communication network such as Gigabit Ethernet.

Figure 17A:
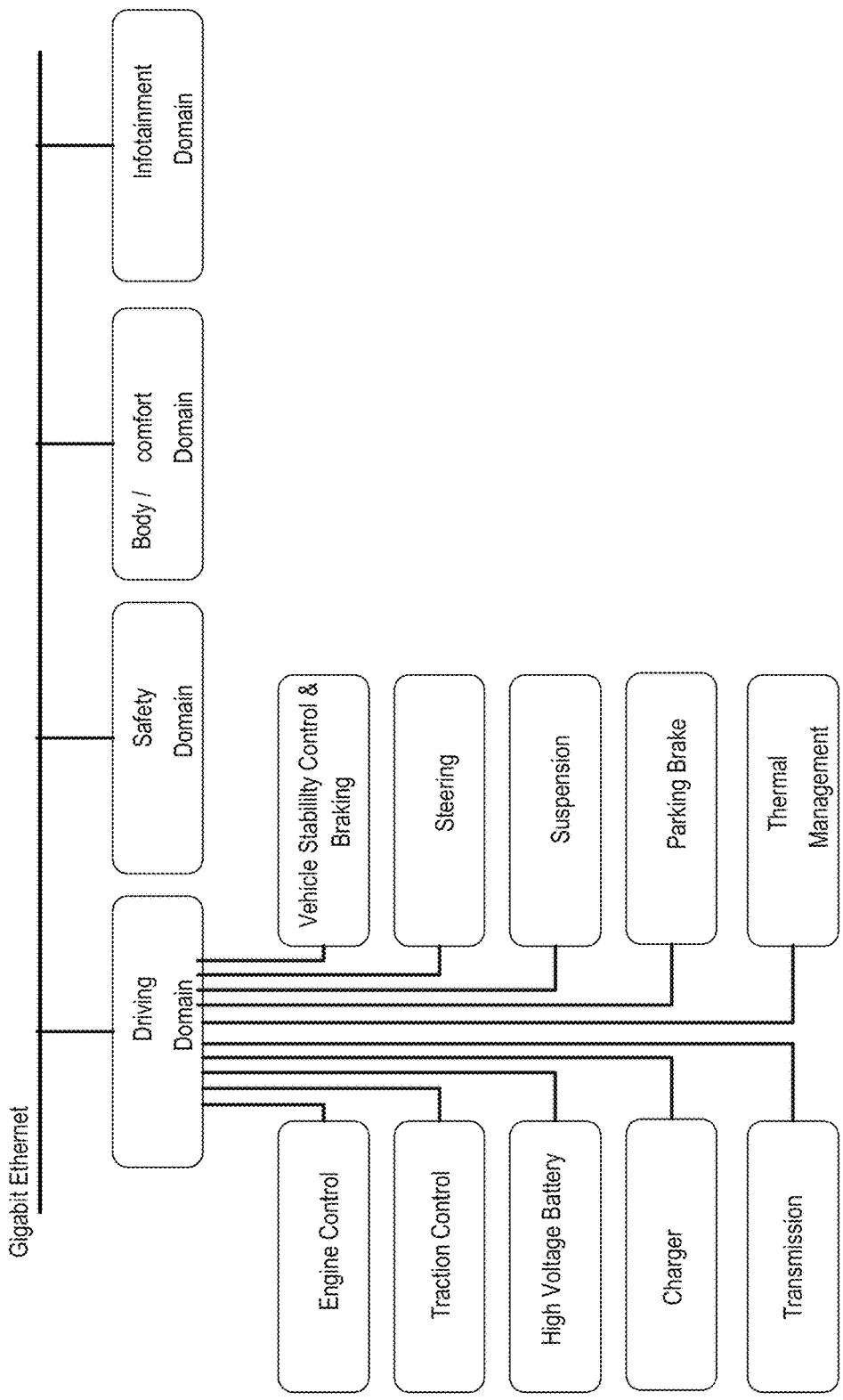
FIG. 17A to 17D illustrates a further example, of how the concept shown in FIG. 16 can be used to connect several control units by forming a "domain" structure, wherein each domain relates to specific (global) functions of an automobile.

FIG. 17A illustrates the divisions of the domain "Driving". Accordingly, the domain may be grouped into the divisions "Engine Control", "Traction Control", "High Voltage Battery" (in case of Hybrid Vehicles), "Charger", "Transmission", "Vehicle Stability Control and Braking", "Steering", "Suspension", "Parking Brake", "Thermal Management". As already mentioned with regard to FIG. 16, one control unit may assume the role of a master control unit, which includes the performance cluster. In the present example, this may be the control unit implementing the Engine Control (ECU).

Figure 17B:
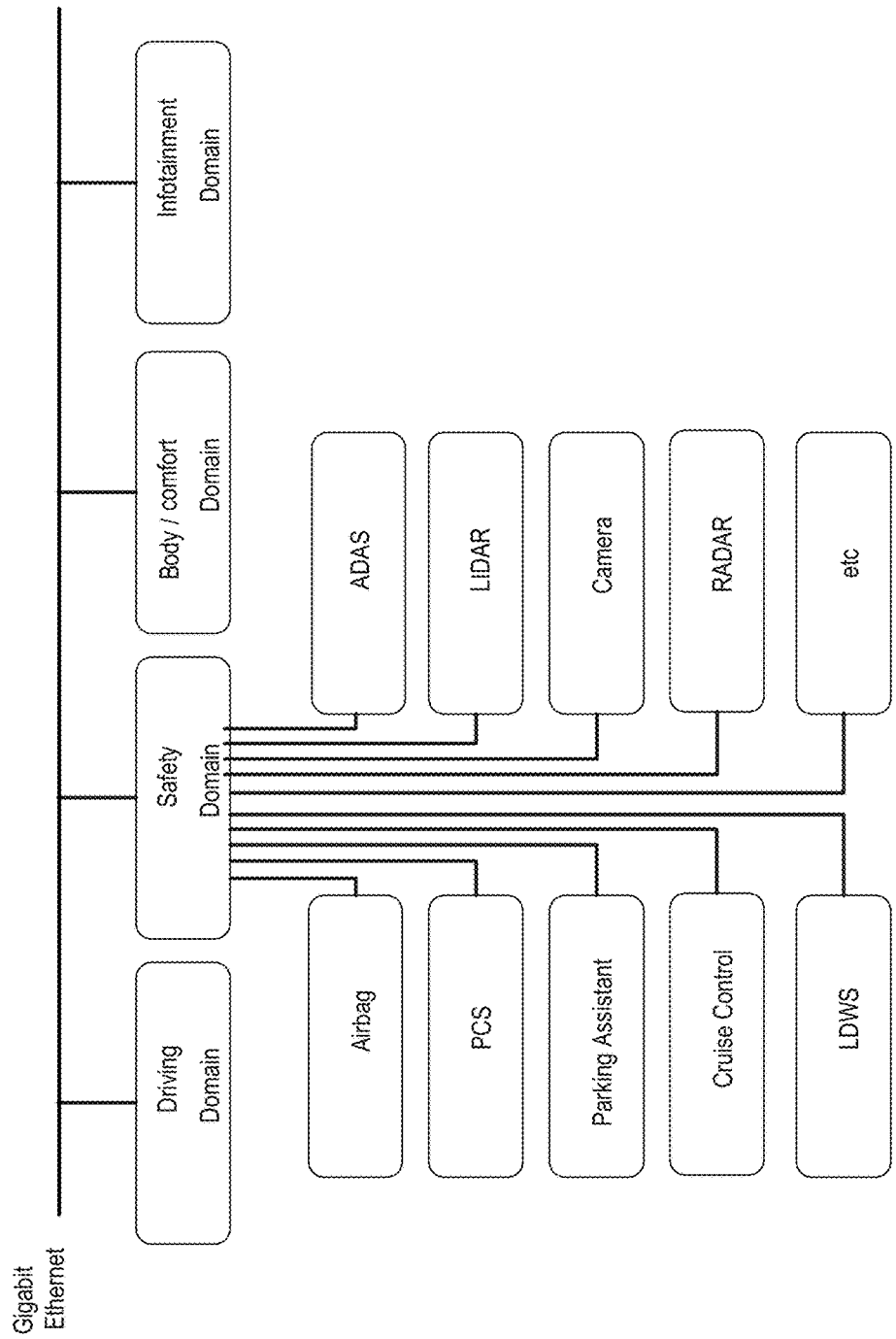

FIG. 17B illustrates the divisions of the domain "Safety". Accordingly, the domain may be grouped into the divisions "Airbag", "PCS" (Pre-Crash-Safety System), "Parking Assistant", "Cruise Control", "LDWS" (Lane Departure Warning System), "ADAS" (Advanced Driver Assistance System), "LIDAR", "RADAR", "Camera" (e.g. Rear-View Camera), etc. Again, one control unit may assume the role of a master control unit, which includes the performance cluster. In the present example, this may be the control unit implementing the Airbag Control.

Figure 17C:
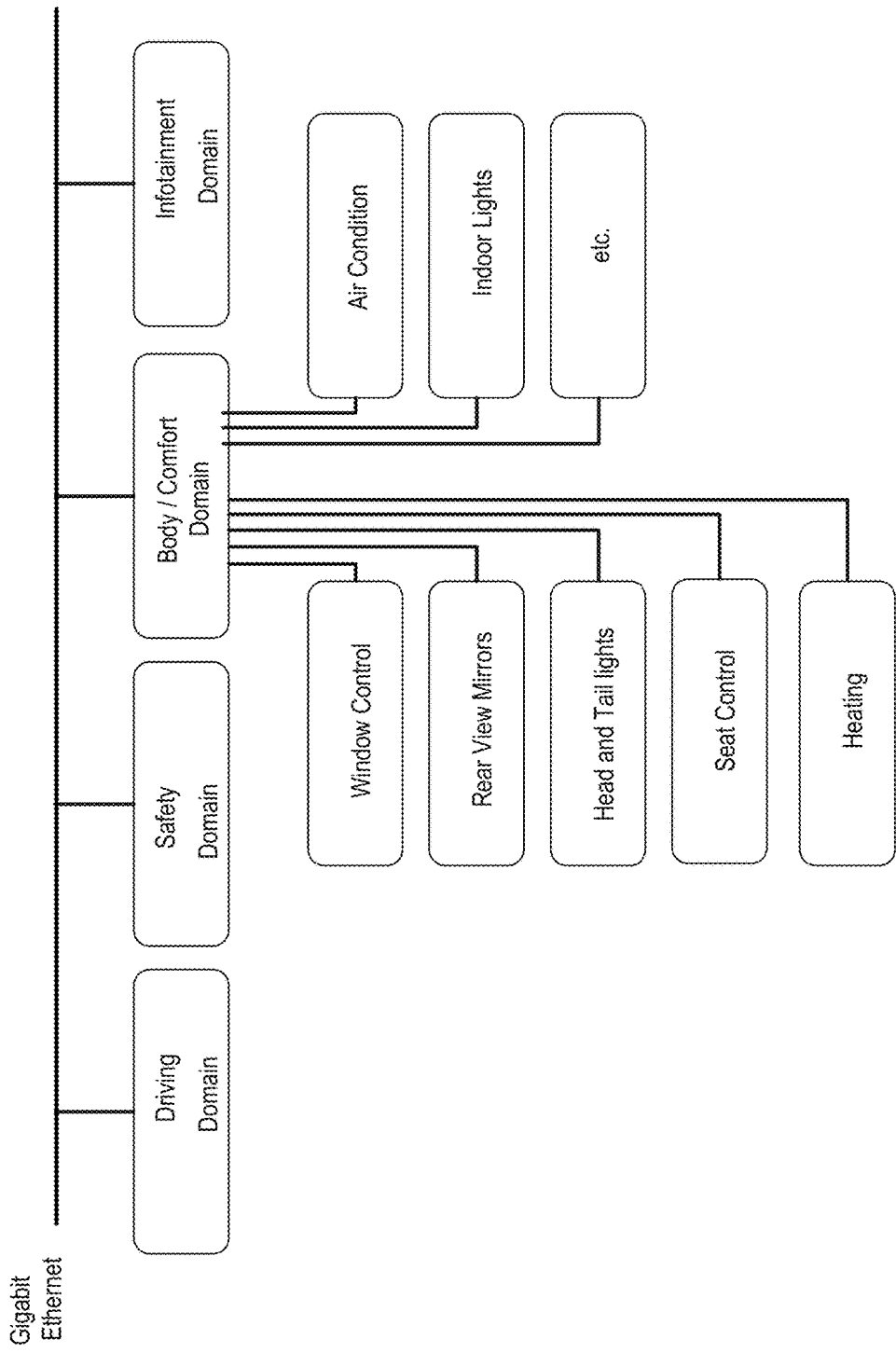

FIG. 17C illustrates the divisions of the domain "Body/Comfort". Accordingly, the domain may be grouped into the divisions "Window Control", "Rear View Mirrors" (e.g. anti-glare functions), "Head and Tail Lights", "Seat Control" (positioning and seat warmers), "Heating", "Air Condition", "Indoor Lights", etc. In the present example, the control unit for the Air Condition may take over the role of the master control unit, whereas the other control units are implemented as "smart" slave units. However, it would be also possible to implement a master control unit without a specific peripheral IC. In that case, the master control unit does not directly control specific actuators but only indirectly by controlling the smart slave control units connected thereto.

Figure 17D:
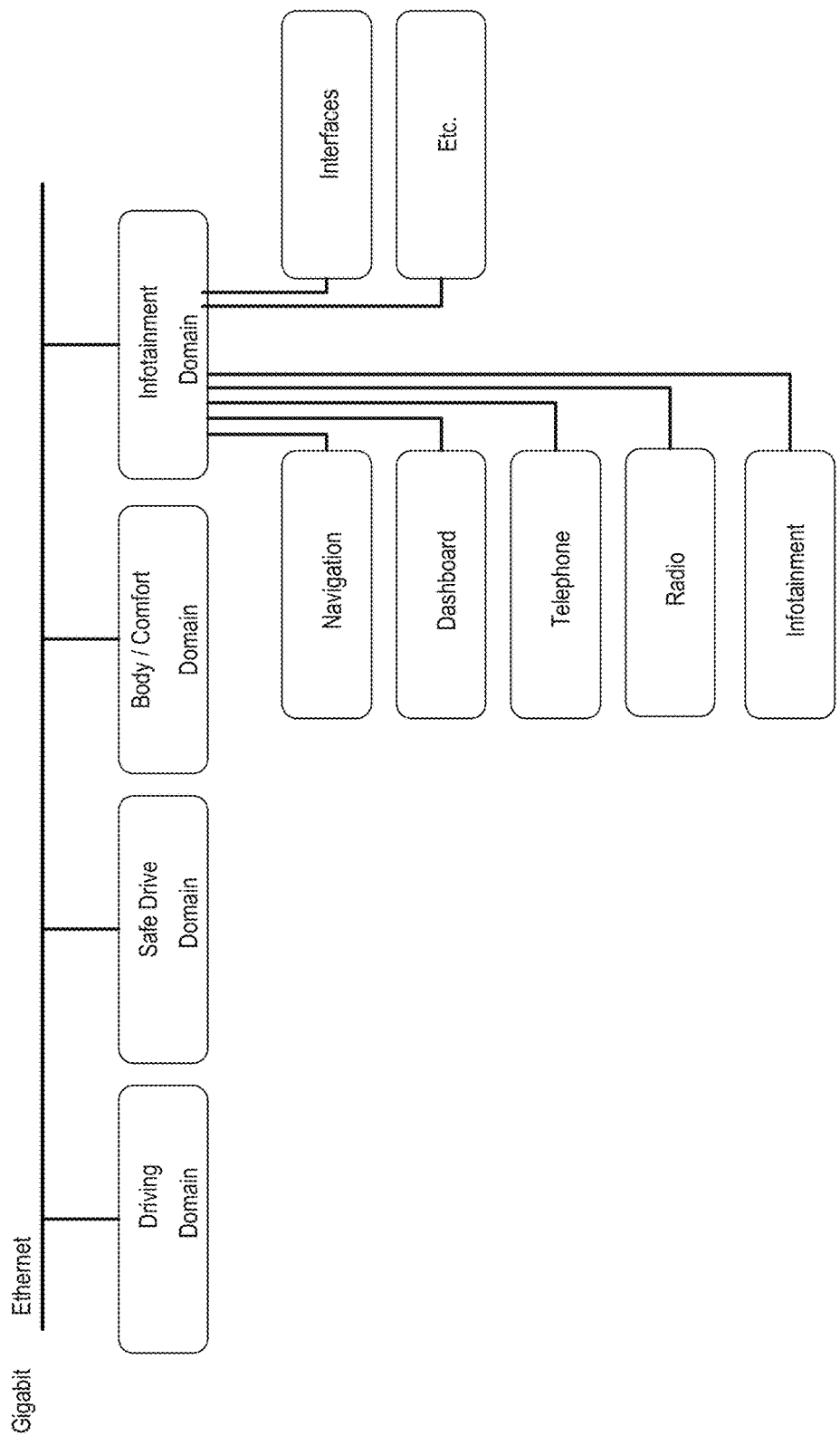

FIG. 17D illustrates the divisions of the domain "Infotainment". Accordingly, the domain may be grouped into the divisions "Navigation", "Dashboard", "Telephone", "Radio", "Infotainment", "Interfaces" (e.g. Wireless LAN), etc. In the present example, the control unit for the dashboard control may take over the role of the master control unit, whereas the other control units are implemented as "smart" slave units.

Some aspects of the embodiments described herein are outlined below. It is noted that the following is not an exhaustive enumeration of features but only an exemplary summary. One embodiment relates to an electronic control unit for engine control in an automobile is described herein (see, e.g., FIGS. 9 and 10). Accordingly, the electronic control unit comprises a first semiconductor chip (see, e.g., FIG. 10, Performance Cluster 1') with first circuitry integrated therein, a second semiconductor chip (see, e.g., FIG. 10, Peripheral IC2') with second circuitry integrated therein, and a digital real-time communication link connecting the first circuitry and the second circuitry (see, e.g., FIG. 10, high speed serial bus 7). The second circuitry comprises a master angle estimation circuit (see, e.g., FIG. 11, circuit 201), which is configured to estimate an angular position of the engine based on at least one angular position sensor signal (e.g. from the crank-shaft sensor 11). Furthermore, the first circuitry comprises a slave angle estimation circuit (see, e.g., FIG. 11, circuit 101), which is configured to estimate an angular position of the engine based on information concerning angular position received form the master estimation circuit via the communication link.

In one embodiment, the first circuitry (in the Performance Cluster 1') includes a first clock circuit (see, e.g., FIG. 11, oscillator 13 and PLL 103) and the second circuitry (in the Peripheral IC 2', 2a, etc.) includes a second clock circuit (see, e.g., FIG. 11, PLL 203), wherein the first clock circuit and the second clock circuit share the same time base (provided, e.g., by crystal oscillator 13) and timing information is exchanged via the communication link. The first circuitry (in the Performance Cluster 1') may include a first synchronization circuit (see, e.g. FIG. 11, circuit 106) that is coupled to the slave angle estimation circuit (see, e.g. FIG. 11, circuit 101), whereas the second circuitry (in the Peripheral IC 2', 2a, etc.) may include a second synchronization circuit (see, e.g. FIG. 11, circuit 206) that is coupled to the master angle estimation circuit (see, e.g. FIG. 11, circuit 201). The second synchronization circuit may regularly transmit synchronization information (see, e.g., FIG. 12A, diagram "data transfer") to the first synchronization circuit, and the slave angle estimation circuit may adjust the angle estimation based on the synchronization information received by the first synchronization circuit.

In another embodiment the master angle estimation circuit regularly transmits synchronization information (see, e.g., FIG. 12A, diagram "data transfer") to the slave angle estimation circuit, wherein the synchronization information includes an angle value (e.g. angle A^) and a respective time value (e.g. time T^). The synchronization information may be transmitted via at least one synchronization circuit (e.g. circuit 106 and/or 206), and the synchronization information may be transmitted as a serial digital data stream across the serial communication link (e.g. high-speed real-time capable serial bus 7). The slave angle estimation circuit may be configured to adjust the angle estimation (e.g. the generation of microticks µTi) based on the synchronization information received via the serial communication link.

Generally, the angular position sensor signal (e.g. received from the crank-shaft sensor 11) may be indicative of subsequent angle periods of a predefined angle increment (e.g. 6°, see FIG. 12A-C, periods $P_n$). The begin of each angle period being signaled (e.g. by a rising edge of the sensor signal, see FIG. 12A-C) to the master angle estimation circuit. The information concerning angular position received form the master estimation circuit via the communication link signals the begin of each angle period to the slave angle estimation circuit (see, e.g. FIG. 12A-C, diagram labelled "sensor signal (reproduced)"). To estimate angular position the master angle estimation circuit and the slave angular estimation circuit may include a first and a second interpolation circuit (see, e.g., FIGS. 13A-B, circuits 1018 and 2018), respectively. The first and the second interpolation circuits may be configured to subdivide subsequent angle periods of a predefined angle increment into a defined number of ticks (see, e.g., FIG. 12A-C, diagrams referring to µTicks). The begin of each period of the subsequent angle periods may be indicated to the master angle estimation circuit by the angular position sensor signal (e.g. crank-shaft sensor signal), whereas—as mentioned above—the begin of each period of the subsequent angle periods is indicated to the slave angle estimation circuit by the information concerning angular position received form the master estimation circuit via the communication link. The master angle estimation circuit may include a prediction circuit (see, e.g., FIG. 13A-B, circuit 2017) which is configured to provide, for each angle period of the subsequent angle periods, an estimated angular velocity value (herein referred to as V^). The temporal rate, at which the micro-ticks are generated by the first interpolation circuit (e.g. circuit 2018) may be adjusted dependent on the estimated angular velocity value. The estimated angular velocity value is regularly transmitted to the slave angle estimation circuit via the serial communication link, and the temporal rate, at which the ticks are generated by the second interpolation unit (e.g. circuit 1018) is adjusted dependent on the estimated angular velocity value received via the serial communication link (see FIG. 12A-C, velocity V^ is included in the transmitted data frame).

One embodiment relates to a system for synchronizing angular position information between a first and a second semiconductor chip used for engine management in an automobile. In accordance with the embodiments described herein, the system comprises the first semiconductor chip (see, e.g., FIG. 10, Performance Cluster 1'), which has first circuitry integrated therein, the second semiconductor chip (see, e.g., FIG. 10, Peripheral IC 2'), which has second circuitry integrated therein, a digital real-time communication link connecting the first circuitry and the second circuitry (see, e.g., FIG. 10, high-speed serial link 7). The second circuitry comprise a master angle estimation circuit (see, e.g., FIG. 11, circuit 201), which is configured to estimate an angular position of the engine based on at least one angular position sensor signal (e.g. the output signal of the crank-shaft sensor 11). Furthermore, the first circuitry comprise a slave angle estimation circuit (see, e.g., FIG. 11, circuit 101), which is configured to estimate an angular position of the engine based on information concerning angular position received form the master angle estimation circuit via the communication link. The information concerning angular position may be transmitted form the master estimation circuit via the communication link to the slave angle estimation circuit regularly in subsequent angle periods of a predefined angle increment (e.g. 6°, see FIG. 12A-C).

Moreover, another embodiment relates to a method for synchronizing angular position information between a first and a second semiconductor chip used for engine management in an automobile. Accordingly, the method comprises receiving, in the second semiconductor chip, at least one angular position sensor signal indicative of an angle of the engine to be synchronized (see FIG. 12, diagrams referring to "sensor signal"). The method further comprises estimating, in the second semiconductor chip, a master angular position signal (e.g. a sequence of µTicks, see FIG. 12A-C) based on at least one angular position sensor signal, and transmitting synchronization information from the first to the second semiconductor chip via a digital real-time communication link. The synchronization information may include estimated angular position information based on the angular position sensor signal (e.g. values for A^, T^ and V^, see FIG. 12A-C). In the first semiconductor chip, a slave angular position signal is estimated based on synchronization information received form the second semiconductor chip. In a specific embodiment, the angular position sensor signal is indicative of subsequent angle periods (e.g. periods $P_n$, see FIG. 12A-C) of a predefined angle increment (e.g. 6°). The begin of each angle period may be signaled to the first semiconductor chip. In the first semiconductor chip, a time base signal may be received, and timing information may transmitted from the first semiconductor chip via the communication link to the second semiconductor chip (see also FIG. 15).

Although various exemplary embodiments have been disclosed, it will be apparent to those skilled in the art that changes and modifications can be made according to a specific implementation of the various embodiments and without departing from the spirit and scope of this disclosure. It will be obvious to those reasonably skilled in the art that other components performing the same functions may be suitably substituted. Particularly, signal processing functions may be performed either in the time domain or in the frequency domain while achieving substantially equal results. It should be mentioned that features explained with reference to a specific figure may be combined with features of other figures, even in those where not explicitly been mentioned. Further, the methods of this disclosure may be achieved in either all software implementations, using the appropriate processor instructions, or in hybrid implementations that utilize a combination of hardware logic and software logic to achieve the same results. Such modifications to the concept are intended to be covered by the appended claims.

Finally, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

The following examples demonstrate one or more aspects of this disclosure and may be combined in any way.

Example 1

A electronic control unit for engine control in an automobile, the electronic control unit comprising:

a first semiconductor chip with first circuitry integrated therein;

a second semiconductor chip with second circuitry integrated therein; and a digital real-time communication link connecting the first circuitry and the second circuitry, wherein the second circuitry comprise a master angle estimation circuit, which is configured to estimate an angular position of the engine based on at least one angular position sensor signal, and wherein the first circuitry comprise a slave angle estimation circuit, which is configured to estimate an angular position of the engine based on information concerning angular position received form the master estimation circuit via the communication link.

Example 2

The electronic control unit of example 1, wherein the first circuitry includes a first clock circuit and the second circuitry includes a second clock circuit, and wherein the first clock circuit and the second clock circuit share the same time base and timing information is exchanged via the communication link.

Example 3

The electronic control unit of any combination of examples 1-2, wherein the time base is provided by a crystal oscillator.

Example 4

The electronic control unit of any combination of examples 1-3, wherein the first circuitry includes a first synchronization circuit that is coupled to the slave angle estimation circuit, and wherein the second circuitry includes a second synchronization circuit that is coupled to the master angle estimation circuit, wherein the second synchronization circuit regularly transmits synchronization information to the first synchronization circuit, and wherein the slave angle estimation circuit adjusts the angle estimation based on the synchronization information received by the first synchronization circuit.

Example 5

The electronic control unit of any combination of examples 1-4, wherein the master angle estimation circuit regularly transmit synchronization information to the slave angle estimation circuit, the synchronization information includes an angle value and a respective time value.

Example 6

The electronic control unit of any combination of examples 1-5, wherein the synchronization information is transmitted via at least one synchronization unit, and wherein the synchronization information is transmitted as a serial digital data stream across the serial communication link.

Example 7

The electronic control unit of any combination of examples 1-6, wherein the slave angle estimation circuit is configured to adjust the angle estimation based on the synchronization information received via the serial communication link.

Example 8

The electronic control unit of any combination of examples 1-7, wherein the angular position sensor signal is indicative of subsequent angle periods of a predefined angle increment; the begin of each angle period being signaled to the master angle estimation circuit.

Example 9

The electronic control unit of any combination of examples 1-8, wherein the information concerning angular position received form the master estimation circuit via the communication link signals the begin of each angle period to the slave angle estimation circuit.

Example 10

The electronic control unit of any combination of examples 1-9, wherein—to estimate angular position—the master angle estimation circuit and the slave angular estimation circuit include a first and a second interpolation circuit, respectively, the first and the second interpolation circuits being configured to subdivide subsequent angle periods of a predefined angle increment into a defined number of ticks.

Example 11

The electronic control unit of any combination of examples 1-10, wherein the begin of each period of the subsequent angle periods is indicated to the master angle estimation circuit by the angular position sensor signal.

Example 12

The electronic control unit of any combination of examples 1-11,
wherein the begin of each period of the subsequent angle periods is indicated to the slave angle estimation circuit by the information concerning angular position received form the master estimation circuit via the communication link.

Example 13

The electronic control unit of any combination of examples 1-12,
wherein the master angle estimation circuit includes a prediction circuit which is configured to provide, for each angle period of the subsequent angle periods, an estimated angular velocity value.

Example 14

The electronic control unit of any combination of examples 1-13,
wherein the temporal rate, at which the ticks are generated by the first interpolation unit is adjusted dependent on the estimated angular velocity value.

Example 15

The electronic control unit of examples 1-14,
wherein the estimated angular velocity value is regularly transmitted to the slave angle estimation circuit via the serial communication link, and
wherein the temporal rate, at which the ticks are generated by the second interpolation unit is adjusted dependent on the estimated angular velocity value received via the serial communication link.

Example 16

A system for synchronizing angular position information between a first and a second semiconductor chip used for engine management in an automobile, the system comprising:
the first semiconductor chip, which has first circuitry integrated therein;
the second semiconductor chip, which has second circuitry integrated therein; and
a digital real-time communication link connecting the first circuitry and the second circuitry,
wherein the second circuitry comprise a master angle estimation circuit, which is configured to estimate an angular position of the engine based on at least one angular position sensor signal, and
wherein the first circuitry comprise a slave angle estimation circuit, which is configured to estimate an angular position of the engine based on information concerning angular position received form the master angle estimation circuit via the communication link.

Example 17

The system of example 16, wherein the information concerning angular position is transmitted form the master estimation circuit via the communication link to the slave angle estimation circuit regularly in subsequent angle periods of a predefined angle increment.

Example 18

A method for synchronizing angular position information between a first and a second semiconductor chip used for engine management in an automobile, the method comprising:
receiving, in the second semiconductor chip, at least one angular position sensor signal indicative of an angle of the engine to be synchronized;
estimating, in the second semiconductor chip, a master angular position signal based on at least one angular position sensor signal;
transmitting synchronization information from the first to the second semiconductor chip via a digital real-time communication link, the synchronization information including estimated angular position information based on the angular position sensor signal; and
estimating, in the first semiconductor chip, a slave angular position signal based on synchronization information received form the second semiconductor chip.

Example 19

The method of example 18,
wherein the angular position sensor signal is indicative of subsequent angle periods of a predefined angle increment, the begin of each angle period being signaled to the first semiconductor chip.

Example 20

The method of any combination of examples 18-19, further comprising:
receiving, in the first semiconductor chip, a time base signal; and
transmitting timing information from the first semiconductor chip via the communication link to the second semiconductor chip.

These and other examples are within the scope of the following claims.

We claim:
1. An electronic control unit for engine control in an automobile, the electronic control unit comprising:
a first semiconductor chip including first circuitry integrated therein, wherein the first circuitry comprises a slave angle estimation circuit;
a second semiconductor chip including second circuitry integrated therein, wherein the second circuitry comprises a master angle estimation circuit; and
a digital real-time communication link configured to connect the first circuitry and the second circuitry,
wherein the master angle estimation circuit is configured to:
estimate an angular position of the engine, an angular velocity value, and a respective time value based on at least one angular position sensor signal; and
transmit, via the digital real-time communication link, the angular position of the engine, the angular velocity value, and the respective time value to the slave angle estimation circuit,
wherein the slave angle estimation circuit is configured to estimate an angular position of the engine based on the angular position and the respective time value received from the master angle estimation circuit via the digital real-time communication link,
wherein the master angle estimation circuit comprises a first interpolation circuit configured to subdivide an angle increment into a predefined number of ticks and to adjust a temporal rate, at which the ticks are generated, based on the angular velocity value, and
wherein the slave angle estimation circuit comprises a second interpolation circuit configured to subdivide the angle increment into the predefined number of ticks and to adjust the temporal rate, at which the ticks are generated, based on the angular velocity value received from the master angle estimation circuit via the digital real-time communication link.

2. The electronic control unit of claim 1,
wherein the first circuitry includes a first clock circuit and the second circuitry includes a second clock circuit, and
wherein the first clock circuit and the second clock circuit share the same time base and timing information is exchanged via the digital real-time communication link.

3. The electronic control unit of claim 2, wherein the time base is provided by a crystal oscillator.

4. The electronic control unit of claim 1,
wherein the first circuitry includes a first synchronization circuit that is coupled to the slave angle estimation circuit, and wherein the second circuitry includes a second synchronization circuit that is coupled to the master angle estimation circuit,
wherein the second synchronization circuit is configured to regularly transmit synchronization information to the first synchronization circuit,
wherein the synchronization information comprises the angular position, the angular velocity value, and the respective time value estimated by the master angle estimation circuit, and
wherein the slave angle estimation circuit is configured to adjust the angular position estimated by the slave angle estimation circuit based on the synchronization information received by the first synchronization circuit.

5. The electronic control unit of claim 1, wherein the master angle estimation circuit is configured to regularly transmit synchronization information to the slave angle estimation circuit, wherein the synchronization information includes the angular position, the angular velocity value, and the respective time value estimated by the master angle estimation circuit.

6. The electronic control unit of claim 5,
wherein the master angle estimation circuit is configured to transmit the synchronization information via at least one synchronization unit, and
wherein the master angle estimation circuit is configured to transmit the synchronization information as a serial digital data stream across the digital real-time communication link.

7. The electronic control unit of claim 6, wherein the slave angle estimation circuit is configured to adjust the angular position estimated by the slave angle estimation circuit based on the synchronization information received via the digital real-time communication link.

8. The electronic control unit of claim 1, wherein the at least one angular position sensor signal is indicative of subsequent angle periods of the angle increment, a beginning of each angle period being signaled to the master angle estimation circuit by the at least one angular position sensor signal.

9. The electronic control unit of claim 8, wherein the angular position received from the master angle estimation circuit via the digital real-time communication link signals the beginning of each angle period to the slave angle estimation circuit.

10. The electronic control unit of claim 1,
wherein the first interpolation circuit of the master angle estimation circuit is configured to subdivide subsequent angle periods of the angle increment into the predefined number of ticks based on the angular velocity value, and
wherein the second interpolation circuit of the slave angle estimation circuit is configured to subdivide the subsequent angle periods of the angle increment into the predefined number of ticks based on the angular velocity value received from the master angle estimation circuit via the digital real-time communication link.

11. The electronic control unit of claim 10, wherein a beginning of each period of the subsequent angle periods is indicated to the master angle estimation circuit by the at least one angular position sensor signal.

12. The electronic control unit of claim 11, wherein the beginning of each period of the subsequent angle periods is indicated to the slave angle estimation circuit by the angular position and the respective time value received from the master angle estimation circuit via the digital real-time communication link.

13. The electronic control unit of claim 10, wherein the master angle estimation circuit includes a prediction circuit configured to provide, for each angle period of the subsequent angle periods, the angular velocity value.

14. The electronic control unit of claim 13, wherein the master angle estimation circuit is configured to adjust the temporal rate, at which the ticks are generated by the first interpolation unit, dependent on the angular velocity value.

15. The electronic control unit of claim 13, wherein the master angle estimation circuit is configured to regularly transmit the angular velocity value to the slave angle estimation circuit via the digital real-time communication link.

16. A system for synchronizing angular position information between a first semiconductor chip and a second semiconductor chip used for engine management in an automobile, the system comprising:
the first semiconductor chip including first circuitry integrated therein, wherein the first circuitry comprises a slave angle estimation circuit;
the second semiconductor chip including second circuitry integrated therein, wherein the second circuitry comprises a master angle estimation circuit; and
a digital real-time communication link configured to connect the first circuitry and the second circuitry,
wherein the master angle estimation circuit is configured to:
estimate an angular position of the engine, an angular velocity value, and a respective time value based on at least one angular position sensor signal; and
transmit, via the digital real-time communication link, the angular position of the engine, the angular velocity value, and the respective time value to the slave angle estimation circuit,
wherein the slave angle estimation circuit is configured to estimate an angular position of the engine based on the angular position and the respective time value received from the master angle estimation circuit via the digital real-time communication link,
wherein the master angle estimation circuit comprises a first interpolation circuit configured to subdivide an angle increment into a predefined number of ticks and to adjust a temporal rate, at which the ticks are generated, based on the angular velocity value, and wherein the slave angle estimation circuit comprises a second interpolation circuit configured to subdivide the angle increment into the predefined number of ticks and to adjust the temporal rate, at which the ticks are generated, based on the angular velocity value received from the master angle estimation circuit via the digital real-time communication link.

17. The system of claim 16, wherein the master angle estimation circuit is configured to regularly transmit, via the digital real-time communication link, the angular position, the angular velocity value, and the respective time value estimated by the master angle estimation circuit to the slave angle estimation circuit in subsequent angle periods of the angle increment.

18. A method for synchronizing angular position information between a first semiconductor chip and a second semiconductor chip used for engine management in an automobile, the method comprising:

receiving, in the second semiconductor chip, at least one angular position sensor signal indicative of an angle of the engine to be synchronized;

estimating, in the second semiconductor chip, an angular position of the engine, an angular velocity value, and a respective time value based on the at least one angular position sensor signal;

transmitting synchronization information from the second semiconductor chip to the first semiconductor chip via a digital real-time communication link, the synchronization information including the angular position of the engine, the angular velocity value, and the respective time value;

estimating, in the first semiconductor chip, an angular position of the engine based on the synchronization information received from the second semiconductor chip via the digital real-time communication link;

subdividing, in the second semiconductor chip, an angle increment into a predefined number of ticks;

adjusting, in the second semiconductor chip, a temporal rate, at which the ticks are generated, based on the angular velocity value;

subdividing, in the first semiconductor chip, the angle increment into the predefined number of ticks; and adjusting, in the first semiconductor chip, the temporal rate, at which the ticks are generated, based on the angular velocity value received from the second semiconductor chip via the digital real-time communication link.

19. The method of claim 18, wherein the at least one angular position sensor signal is indicative of subsequent angle periods of the angle increment, a beginning of each angle period being signaled to the first semiconductor chip by the at least one angular position sensor signal.

20. The method of claim 18, further comprising:

receiving, in the first semiconductor chip, a time base signal; and transmitting, by the first semiconductor chip, timing information via the digital real-time communication link to the second semiconductor chip.

* * * * *